US012812603B2

(12) United States Patent
Zhou et al.

(10) Patent No.: US 12,812,603 B2
(45) Date of Patent: Nov. 24, 2026

(54) COMMUNICATION METHOD, APPARATUS, ELECTRONIC DEVICE, AND COMPUTER-READABLE STORAGE MEDIUM

(71) Applicant: Samsung Electronics Co., Ltd., Suwon-si (KR)

(72) Inventors: Miao Zhou, Beijing (CN); Min Wu, Beijing (CN); Feifei Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 18/706,220

(22) PCT Filed: Oct. 27, 2022

(86) PCT No.: PCT/KR2022/016562
§ 371 (c)(1),
(2) Date: Apr. 30, 2024

(87) PCT Pub. No.: WO2023/080540
PCT Pub. Date: May 11, 2023

(65) Prior Publication Data

US 2026/0143469 A1 May 21, 2026

(30) Foreign Application Priority Data

Nov. 3, 2021 (CN) ......................... 202111296572.5

(51) Int. Cl.
*H04W 72/02* (2009.01)
*H04L 1/1812* (2023.01)
*H04W 72/40* (2023.01)

(52) U.S. Cl.
CPC ........... *H04W 72/02* (2013.01); *H04L 1/1812* (2013.01); *H04W 72/40* (2023.01)

(58) Field of Classification Search
CPC .... H04L 5/0091; H04W 28/24; H04W 72/02; H04W 72/0446
USPC .......................................................... 370/329
See application file for complete search history.

(56) References Cited

U.S. PATENT DOCUMENTS

2021/0250954 A1 8/2021 Li et al.
2021/0321430 A1 10/2021 Baghel et al.
2023/0012983 A1* 1/2023 Zhang ................... H04W 72/20
2023/0066942 A1* 3/2023 Liu ....................... H04W 72/02
2023/0087401 A1 3/2023 Shin et al.
2023/0262765 A1* 8/2023 Zhou ................. H04W 74/0816 370/329
2023/0397168 A1* 12/2023 Hui ....................... H04W 72/02
2023/0403730 A1 12/2023 Shen et al.
2024/0015755 A1* 1/2024 Pan ....................... H04W 72/25
2024/0187936 A1* 6/2024 Zhou ..................... H04W 76/14

FOREIGN PATENT DOCUMENTS

EP 4093132 A1 11/2022
WO 2021-167427 A1 8/2021
WO 2022-083767 A1 4/2022

OTHER PUBLICATIONS

Xiaomi: Discussion on inter-UE coordination, 3GPP Draft; R1-2109385, vol. RAN WG1, No. e-Meeting; XP052058331, Sep. 30, 2021.
Moderator (LG Electronics): Feature lead summary for AI 8.11.1.2 Inter-UE coordination for Mode 2 enhancements, 3GPP Draft; R1-2110648, vol. RAN WG1, No. e-Meeting; XP052065855, Oct. 21, 2021.
Extended European Search Report dated Mar. 26, 2025, issued in a European Application No. 22890275.5.
International Search Report dated Feb. 2, 2023, issued in International Patent Application No. PCT/KR2022/016562.
Vivo, Discussion on mode 2 enhancements, R1-2108999, 3GPP TSG RAN WG1 Meeting #106b-e, Oct. 1, 2021.
LG Electronics Inc., Discussion on inter-UE coordination for Mode 2 enhancements, R1-2109861, 3GPP TSG RAN WG1 Meeting #106b-e, Oct. 2, 2021.
Intel Corporation, Solutions for Sidelink Communication with Inter-UE Coordination Feedback, R1-2109632, 3GPP TSG RAN WG1 Meeting #106b-e, Oct. 2, 2021.

* cited by examiner

*Primary Examiner* — Robert J Lopata
(74) *Attorney, Agent, or Firm* — Jefferson IP Law, LLP

(57) ABSTRACT

Embodiments of the present disclosure provide a communication method, apparatus, electronic device and computer-readable storage medium, and the method realizes an accurate and efficient generation of inter-node coordination information (INCI) based on a suitable time-frequency resource range, by determining a content of INCI and determining a resource for transmitting the INCI, and transmits the INCI to a node that needs the information within a suitable time range, such that other nodes can use the INCI in the time range that meets their needs in the process of determining transmission resources to the other nodes, so as to effectively improve reliability of a communication system without over-increasing overhead.

10 Claims, 10 Drawing Sheets

COMMUNICATION METHOD, APPARATUS, ELECTRONIC DEVICE, AND COMPUTER-READABLE STORAGE MEDIUM

TECHNICAL FIELD

The present disclosure relates to a field of wireless communication technology, in particular to a communication method, an apparatus, an electronic device and a computer readable storage medium.

BACKGROUND ART 5G mobile communication technologies define broad frequency bands such that high transmission rates and new services are possible, and can be implemented not only in “Sub 6 GHz” bands such as 3.5 GHZ, but also in “Above 6 GHZ” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In 5G systems, hybrid FSK and QAM modulation (FQAM) and sliding window superposition coding (SWSC) as advanced coding modulations (ACM), as well as filter bank multicarrier (FBMC), non-orthogonal multiple access (NOMA) and sparse code multiple access (SCMA) as advanced access technologies have been developed.

In the prior art, there are still processing details to be refined in sidelink (SL) communication.

Solution to Problem

In order to overcome above-mentioned technical problems or at least partially solve above-mentioned technical problems, the following technical schemes are specially proposed:

According to an aspect of the embodiments of the present disclosure, a communication method performed by a node device is provided, the method including:

determining, by a first node, a resource for transmitting inter-node coordination information (INCI) and a content of the INCI; and transmitting, by the first node, the INCI to a second node, based on the resource for transmitting the INCI and the content of the INCI.

In one optional implementation, determining the resource for transmitting the INCI and the content of the INCI, comprises at least one of the following:

determining the resource for transmitting the INCI according to a first resource selection window (RSW), and determining the content of the INCI according to a second RSW; and determining, according to a third RSW, the resource for the INCI and the content of the INCI.

In one optional implementation, if the first RSW or the second RSW or the third RSW is [n+T1, n+T2], determining the resource for transmitting the INCI and/or determining the content of the INCI, according to the RSW, further includes:

determining a value of T1 and/or T2 based on at least one of the following:

a parameter related to the INCI;

a value of the parameter related to the INCI;

a remaining packet delay budget (PDB) of a transmission of the second node;

time when the second node is triggered to perform a resource determination procedure;

a starting position of the RSW of the second node;

an end position of the RSW of the second node;

a size range of the RSW of the second node;

a position and/or a number of candidate resources of the second node;

a position and/or a number of candidate time units of the second node;

remaining PDBs indicated by a higher layer;

a node processing delay; and validity of the INCI.

In one optional implementation, determining the value of T1 and/or T2 based on the validity of the INCI, comprises at least one of the following:

determining that a value of n+T1 and/or n+T2 is not less than a difference between the time unit in which the second node is triggered to perform the resource determination procedure and a first predetermined time length;

determining that the value of n+T1 and/or n+T2 of the first RSW is not less than a difference between the starting position or the end position of the second RSW and a second predetermined length of time;

determining that the value of n+T1 and/or n+T2 of the second RSW is not larger than a sum of the starting position or the end position of the first RSW and the second predetermined length of time;

determining that the value of n+T1 and/or n+T2 of the first RSW is not less than a difference between the position of the preferred resource and/or the non-preferred resource selected by the first node in the second RSW and the second predetermined length of time; and determining that the value of n+T1 and/or n+T2 of the second RSW is not larger than a sum of the resource and/or a candidate resource for transmitting the INCI in the first RSW selected by the first node and the second predetermined length of time;

wherein, the first predetermined time and the second predetermined time are time lengths corresponding to a time validity of the INCI.

In one optional implementation, if the first RSW or the second RSW is [n+T1, n+T2], determining the resource for transmitting the INCI according to the first RSW and/or determining the content of the INCI according to the second RSW, further includes:

determining a value of T1 and/or T2 of another RSW according to at least one of the following of one RSW of the first RSW and the second RSW:

a starting position;

an end position;

a size range.

In one optional implementation, the time interval between the time unit where the resource for transmitting the INCI is located and the time unit where the earliest resource indicated in the INCI is located is not less than a node processing delay; and/or, the time interval between the end position of the first RSW and the time unit where the earliest resource indicated in the INCI is located is not less than the node processing delay; and/or, the time interval between the time unit where the resource for transmitting the INCI is located and the starting position of the RSW of the second node is not less than the node processing delay; and/or, the time interval between the time unit where the resource for transmitting the INCI is located and the time when the second node is triggered to perform the resource determination procedure is not less than the node processing delay; and/or, the time interval between the end position of the first RSW and the starting position of the RSW of the second node is not less than the node processing delay; and/or, the time interval between the end position of the first RSW and the time when the second node is triggered to perform the resource determination procedure is not less than the node processing delay;

wherein, the node processing delay includes the sum of at least one of the following:

a delay for the node to decode the INCI;

a delay for the node to use information indicated in the INCI;

a delay for the node to generate and transmit data; and a delay for the node to process a sensing result.

In one optional implementation, the parameter related to the INCI, comprises at least one of the following:

a time range in which the first node transmits the INCI;

a time range in which the second node receives the INCI;

the starting position and/or the end position of the RSW of the INCI of the first node; and a size range of the RSW of the INCI of the first node.

In one optional implementation, the determining the value of T1 and/or T2 according to the parameter related to the INCI, comprises at least one of the following:

determining that the value of n+T1 is not less than a starting position of a time range in which the first node transmits the INCI or a starting position of a time range in which the second node receives the INCI;

determining that the value of n+T2 is not larger than an end position of the time range in which the first node transmits the INCI or an end position of the time range in which the second node receives the INCI;

determining that the value of n+T2 of the first RSW is not larger than a difference between the starting position of the second RSW and a first offset, wherein the first offset corresponds to the node processing delay; and determining that the value of n+T1 of the second RSW is not less than a sum of the end position of the first RSW and the first offset, wherein the first offset corresponds to the node processing delay.

In one optional implementation, determining the value of T1 and/or T2 according to the remaining Packet Delay Bucket (PDB) transmitted by the second node, comprises at least one of the following:

determining that the value of T1 and/or T2 is not larger than a difference between the remaining PDB of the transmission of the second node and a second offset, wherein the second offset is determined according to at least one of the following:

a size range of the RSW of the second node;

a size range of the RSW of the first node;

a node processing delay.

In one optional implementation, determining the value of T2 according to the starting position and/or the end position of the RSW of the second node, comprises at least one of the following:

determining that the value of n+T2 of the first RSW is not larger than a difference between the starting position of the RSW of the second node and a third offset, wherein the third offset corresponds to the node processing delay; and determining that the value of n+T2 of the first RSW is not larger than a difference between the end position of the RSW of the second node and a fourth offset, wherein the fourth offset corresponds to the length of the RSW of the second node, and/or the size range of the RSW of the second node, and/or the node processing delay of the second node.

In one optional implementation, determining the value of T2 according to the position and/or the number of candidate resources of the second node, or the position and/or the number of candidate time units of the second node, comprises at least one of the following:

determining that the value of n+T2 of the first RSW is not larger than a difference between the time unit where the earliest one of the candidate resources of the second node is located and a fifth offset, wherein the fifth offset corresponds to the node processing delay;

determining that the value of n+T2 of the first RSW is not larger than a difference between the earliest time unit in the candidate time units of the second node and the fifth offset; and determining that the value of n+T2 of the first RSW is not larger than a value obtained by subtracting second information from first information and then subtracting a sixth offset, wherein the first information is the end position of the RSW of the second node or "n+remaining PDBs" of the RSW of the second node, and the second information is a minimum number of candidate resources or candidate time units of the second node.

In one optional implementation, determining the resource for transmitting inter-node coordination information (INCI) and/or determining the content of the INCI, comprises at least one of the following:

triggering to determine the resource for transmitting the INCI and/or determine the content of the INCI according to the request signaling from the second node and/or the parameter indicated by the higher layer, wherein there is a predetermined offset between the parameter and a parameter used in a resource determination procedure for a resource not used for transmission or generating the transmission of the INCI.

In one optional implementation, determining the resource for transmitting the INCI and the content of the INCI, comprises at least one of the following:

determining, triggered by the request signaling of the second node, the resource for transmitting the INCI and/or the content of INCI;

determining, triggered by an indication of a higher layer, the resource for transmitting inter-node coordination information (INCI) and/or content of the INCI.

In an optional implementation manner, at least one of the following parameters indicated by signaling is requested:

a resource pool in which the second node performs transmission;

the priority of a transmission of the second node;

a remaining PDB of the transmission of the second node;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node;

a time range in which the first node transmits the INCI;

a time range in which the second node receives the INCI;

the starting position and/or the end position of the RSW of the INCI of the first node;

whether the second node supports or enables or disables re-evaluation;

whether the second node supports or enables or disables pre-emption;

a corresponding re-evaluated resource set or resource range transmitted by the second node; and a corresponding pre-empted resource set or resource range transmitted by the second node.

In an optional implementation manner, the higher layer provides at least one of the following parameters:

a resource pool corresponding to the resource, reported by the first node to the higher layer;

the priority of the INCI of the first node;

the priority of a transmission of the second node;

remaining PDBs;

a time range in which the first node transmits the INCI;

a time range in which the second node receives the INCI;

the starting position and/or the end position of the RSW for transmitting the INCI;

the starting position and/or the end position of the RSW for determining the content of the INCI;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node; and

In one optional implementation, the resource for transmitting the INCI is a physical sidelink feedback channel (PSFCH) resource, and the INCI is carried in the PSFCH.

In one optional implementation, transmitting the INCI to the second node, comprises at least one of the following:

transmitting at least one of the following to the second node:

at least one INCI with the highest priority in the INCI;

at least one HARQ-ACK with the highest priority among the Hybrid Automatic Repeat Request-Acknowledges (HARQ-ACKs); and at least one INCI and/or HARQ-ACK with the highest priority among INCIs and HARQ-ACKs.

In one optional implementation, transmitting the INCI to the second node, comprises at least one of the following:

at least one PSFCH with the highest priority among PSFCHs carrying the INCI;

at least one PSFCH with the highest priority among the PSFCHs carrying the Hybrid Automatic Repeat Request-Acknowledges (HARQ-ACK); and at least one PSFCH with the highest priority among PSFCHs carrying the INCI and PSFCHs carrying HARQ-ACK.

In one optional implementation, a priority of the PSFCH carrying the INCI is determined according to at least one of the following:

a priority parameter indicated by a request signaling of the second node and/or indicated by a higher layer;

a priority parameter indicated in the sidelink control message (SCI) transmitted by the third node, wherein the third node is a node that triggers the first node to transmit the INCI;

INCI-specific priorities; and a priority offset corresponding to the INCI.

In one optional implementation, the method further includes:

determining PSFCH to be transmitted, according to at least one of the priority of the PSFCH, a content carried by the PSFCH, a traffic type, and a HARQ-ACK feedback option based on groupcast.

In one optional implementation, determining PSFCH to be transmitted, comprises at least one of the following:

prioritizing transmitting PSFCH carrying a specific content, for a specific traffic type or a specific HARQ-ACK feedback option of a groupcasted traffic.

In one optional implementation, determining PSFCH to be transmitted, comprises at least one of the following:

determining the PSFCH to be transmitted according to a sum of the priority of the PSFCH and a ninth offset, for PSFCH carrying a specific content;

wherein the ninth offset is determined based on at least one of the content carried by the PSFCH, the traffic type, and the HARQ-ACK feedback option based on groupcast.

In an optional implementation manner, when the first node is a user equipment (UE), the inter-node coordination information (INCI) is inter-UE coordination information (IUCI).

According to another aspect of the embodiments of the present disclosure, a communication apparatus performed by a node device is provided, the apparatus including:

a determining module, configured to determine a resource for transmitting inter-node coordination information (INCI) and a content of the INCI; and a transmitting module, configured to transmit the INCI to a second node, based on the resource for transmitting the INCI and the content of the INCI.

According to another aspect of the present disclosure, an electronic device is provided, the electronic device including:

a transceiver; and a processor coupled to the transceiver and configured to control to perform the steps of the communication method provided in the present disclosure.

According to yet aspect of the present disclosure, a computer readable storage medium stored a computer program thereon is provided, wherein the computer program implements, when executed by a processor, the steps of the communication method provided in the present disclosure.

According to yet another aspect of the present disclosure, a computer program product including a computer program is provided, wherein the computer program implements, when executed by a processor, the steps of the communication method provided in the present disclosure.

Advantageous Effects of Invention

The communication method, apparatus, electronic device and computer-readable storage medium provided in the embodiments of the present disclosure, realize accurate and efficient generation of INCI based on a suitable time-frequency resource range, by determining a content of INCI and determining a resource for transmitting the INCI, and transmit the INCI to a node that needs the information within a suitable time range, such that other nodes can use the INCI in the time range that meets their needs in the process of determining transmission resources to the other nodes, so as to effectively improve reliability of a communication system without over-increasing overhead.

BRIEF DESCRIPTION OF DRAWINGS

In order to more clearly illustrate the technical solutions in the embodiments of the present disclosure, the drawings used in the description of the embodiments of the present disclosure will be briefly described below.

MODE FOR THE INVENTION

Figure 1:
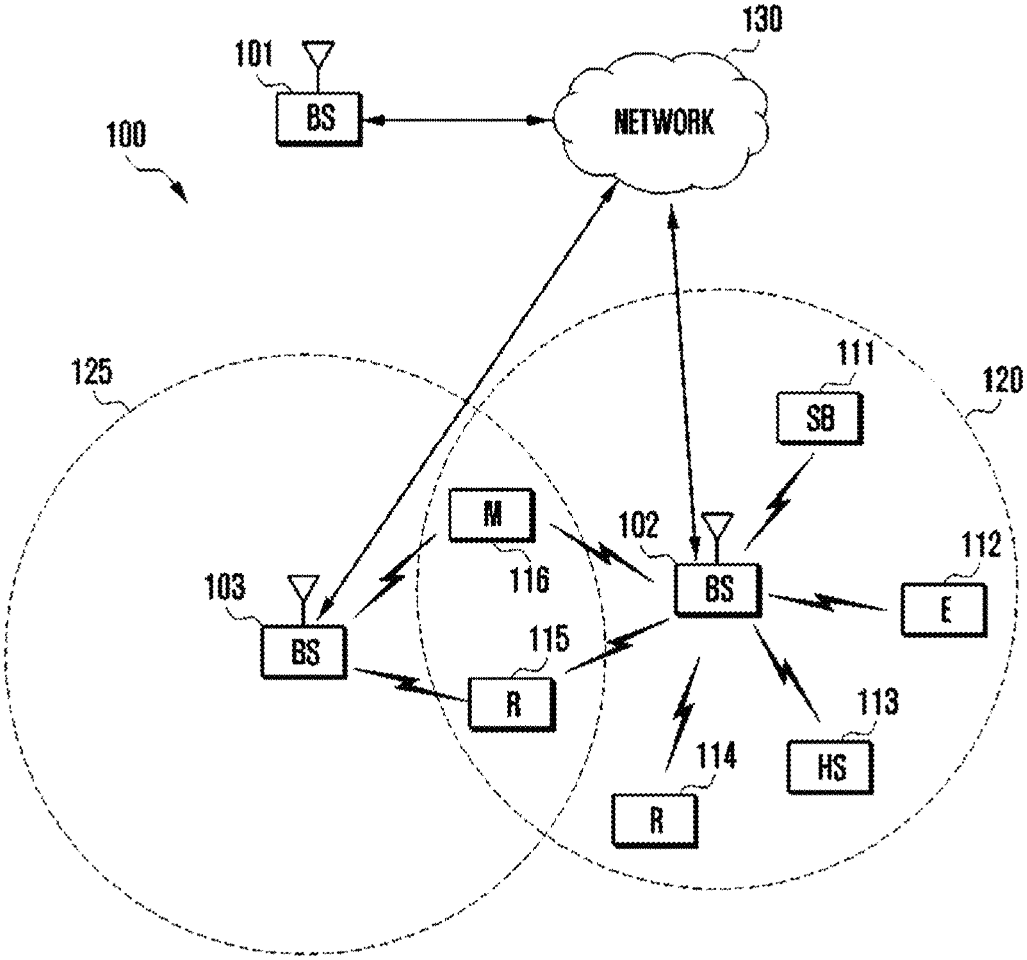
FIG. 1 is a schematic diagram of an overall structure of a wireless network provided by an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", "said" and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103, gNB 101 communicates with gNB 102 and gNB 103, gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
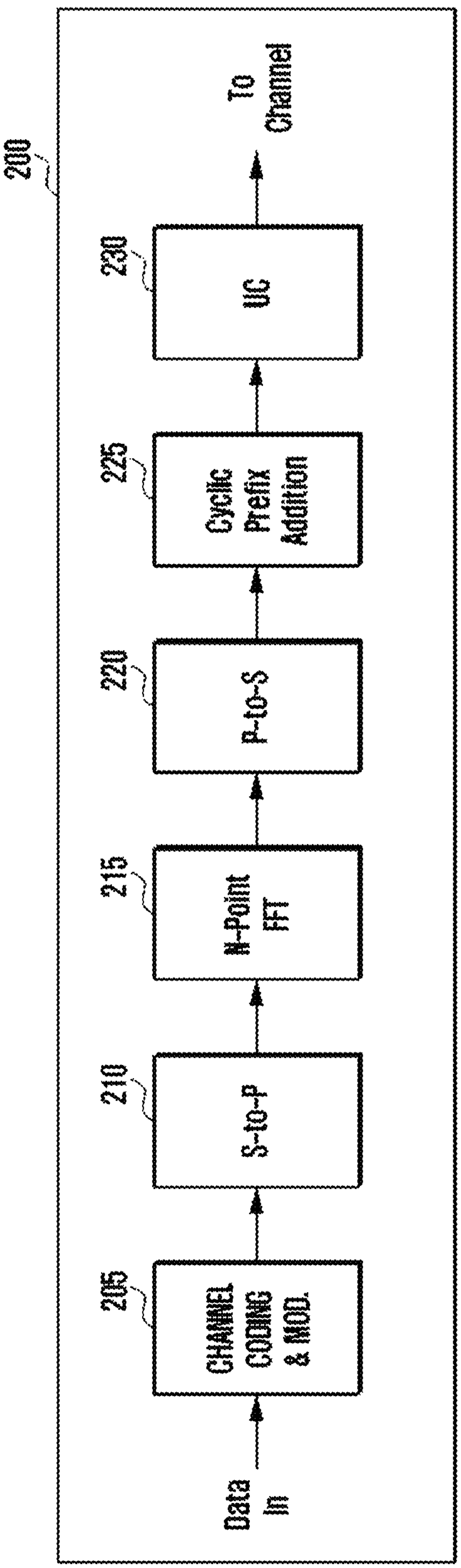
FIG. 2*a* is a schematic diagram of a transmission path provided by an embodiment of the present disclosure.
Figure 2B:
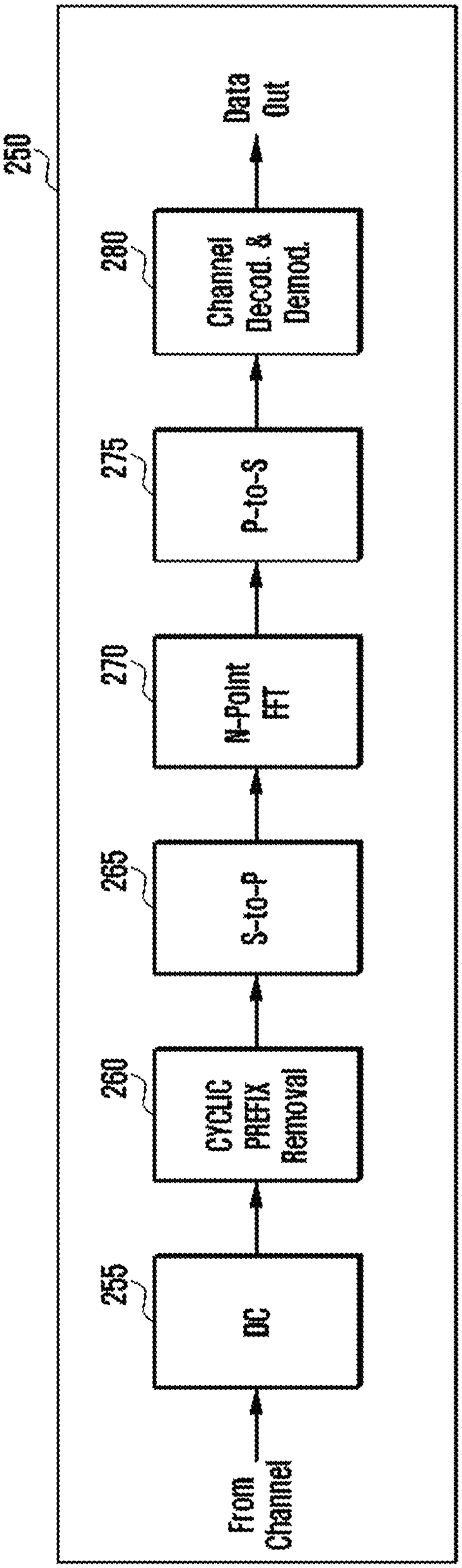
FIG. 2*b* is a schematic diagram of a reception path provided by an embodiment of the present disclosure.

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
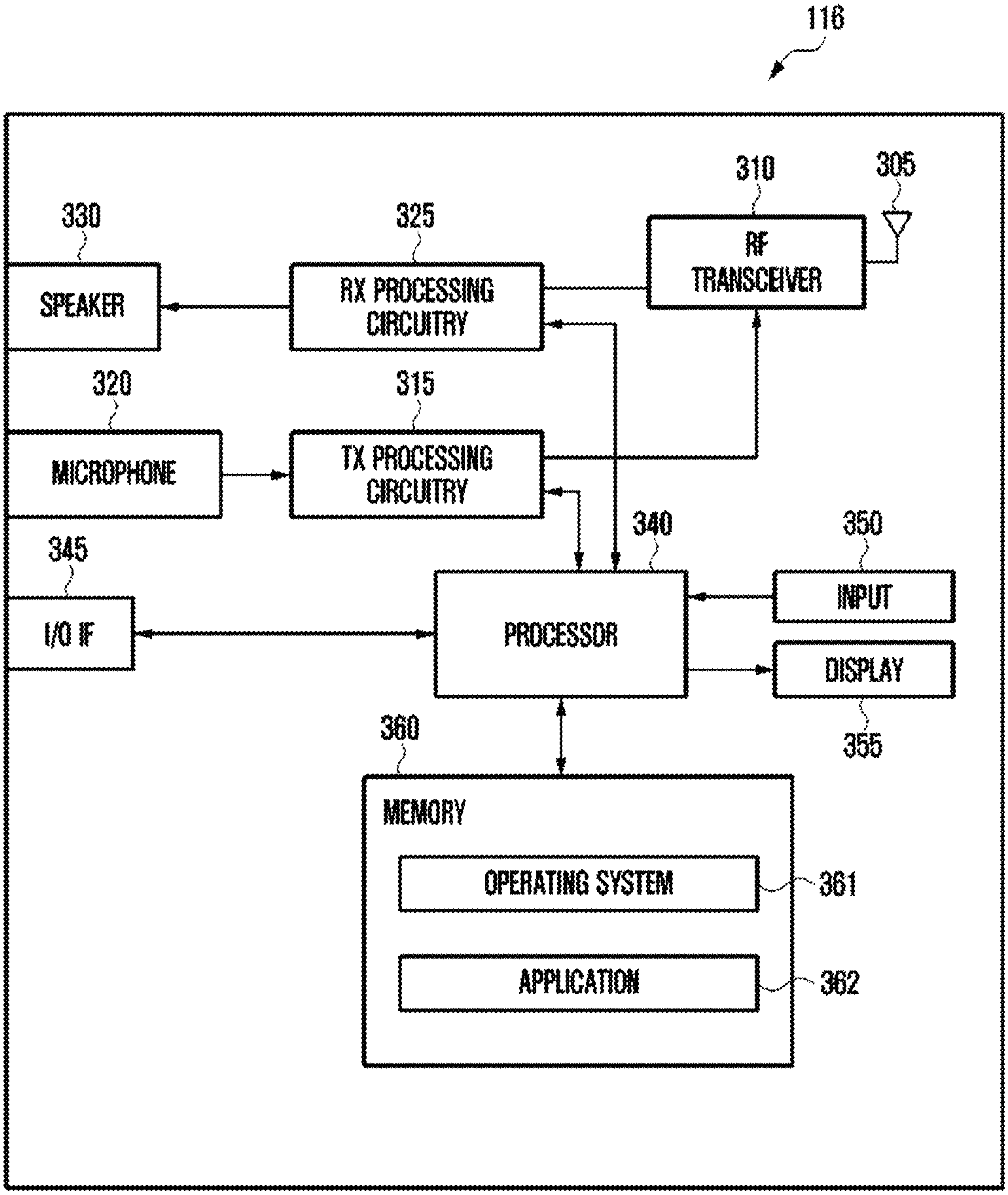
FIG. 3*a* is a schematic structural diagram of a UE provided by an embodiment of the present disclosure.

FIG. 3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
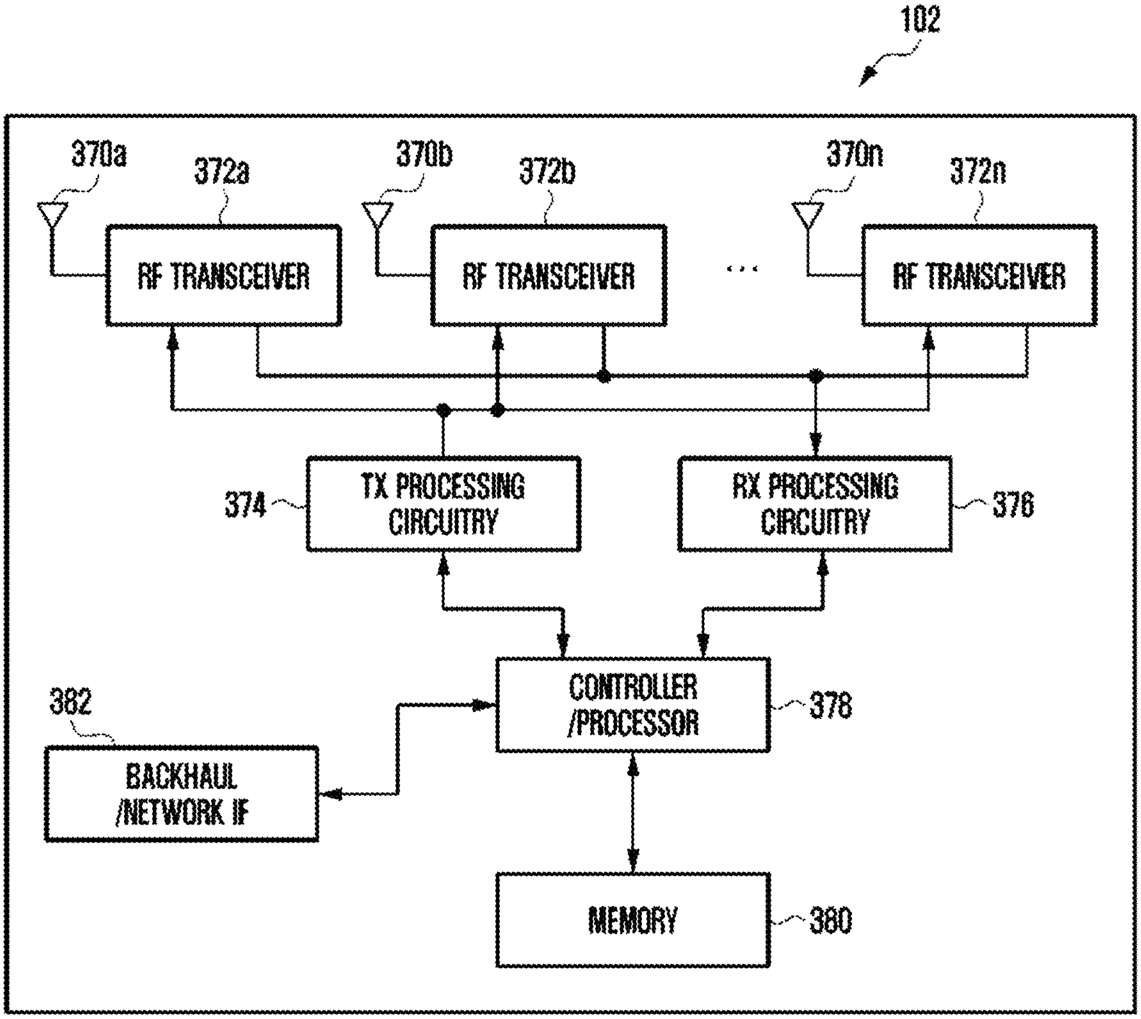
FIG. 3*b* is a schematic structural diagram of a base station provided by an embodiment of the present disclosure.

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that gNB 101 and gNB 103 can include the same or similar structures as gNB 102.

As shown in FIG. 3*b*, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* downconvert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and upconvert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher layer wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In the Long Term Evolution (LTE) technology, sidelink communication includes two main mechanisms of direct communication for device to device (D2D) and communication for vehicle to vehicle/infrastructure/pedestrian/network (hereinafter referred to as V2X). V2X is designed based on D2D technology, which is superior to D2D in terms of data rate, delay, reliability, link capacity and so on. It is the most representative sidelink communication technology in LTE technology. In 5G systems, sidelink communication mainly includes V2X communication currently.

There are several sidelink physical channels defined in NR V2X systems, including a Physical Sidelink Control Channel (PSCCH), a Physical Sidelink Shared Channel (PSSCH) and a Physical Side Link Feedback Channel (PSFCH). The PSSCH is used to carry data, the PSCCH is used to carry sidelink control information (SCI) indicating information such as time-frequency domain resource location, modulation and coding scheme, or a receiving target Identity document (ID) targeted by the PSSCH, and the PSFCH is used to carry Hybrid Automatic Repeat Request-Acknowledge (HARQ-ACK) information corresponding to the data.

In NR V2X systems, at present, a slot in 5G systems is used as the minimum unit of resource allocation in time domain, and a sub-channel is defined as the minimum unit of resource allocation in frequency domain. A sub-channel is configured as several resource blocks (RBs) in frequency domain, and the sub-channel may include resources corresponding to at least one of PSCCH, PSSCH and PSFCH.

From the perspective of resource allocation, the 5G sidelink communication system includes two modes: the resource allocation mode based on scheduling a base station and the resource allocation mode autonomously selected by a UE. In 5G V2X systems, the resource allocation mode based on scheduling a base station and resource allocation mode autonomously selected by a UE, are referred to as mode 1 and mode 2, respectively.

For mode 1, the method for a base station to schedule resources for a sidelink UE is to transmit a sidelink grant to the sidelink UE, and indicate several or periodic sidelink resources for the sidelink UE in the sidelink grant. The sidelink grant includes a dynamic grant and a configured grant, in which the dynamic grant is indicated by Downlink Control Information (DCI), and the configured grant further includes a type 1 configured grant and a type 2 configured grant. The type 1 configured grant is indicated by Radio Resource Control (RRC) signaling and the type 2 configured grant is activated/deactivated by the DCI.

For mode 2, the method for a sidelink UE to select resources autonomously is that the UE always keeps monitoring and buffering a sidelink resource pool, and before a sidelink transmission needs to be transmitted, determines a channel sensing time window and a resource selection time window according to the expected time range for transmitting the sidelink transmission, performs channel sensing within the channel sensing time window, excludes the sidelink resources reserved by other sidelink UE within the resource selection time window according to the result of the channel sensing, and randomly selects sidelink resources not excluded within the resource selection time window for sidelink transmission.

Since that in Mode 2, the transmission resource is determined by a UE at the data transmission end based on perception, the determination procedure actually depends on the wireless environment where the UE at the transmission end is located rather than a UE at the reception end. Since that the radio environments where the UE at the transmission end and the UE at the reception end are located are different and the detected interference is different, the transmission resource determined by the UE at the transmission end does not necessarily have good link quality for the UE at the reception end. Therefore, a technology referred as inter-UE coordination (IUC) is introduced into sidelink communication systems. In these technologies, a UE at the reception provides the UE at the transmission end with the resources preferred by the UE at the reception, non-preferred resources, detected conflicts, expected conflicts, and other information, which may be used by UE at the transmission end to assist it in selecting sidelink resources for transmitting its own data. These technologies can be further extended as that the first UE transmits inter-UE coordination information (IUC) information (IUCI) to the second UE for the second UE to select its transmission resources. In a more extended scenario, it is not limited whether the first UE and the second UE have a communication relationship. For example, the transmission of the second UE may be directed to the first UE, or may be directed to another node such as a third UE.

For the resources preferred/not preferred by the first UE, a typical approach is for the first UE to perform a perception-based determination of which resources are preferred (e.g., resources without radio interference, determined based on perception), and which resources are not preferred (e.g., resources, determined based on perception, with presence/expectation of conflicts, resources that cannot be monitored to due to half-duplex, etc.). Therefore, for IUC technologies, a perception-based resource determination procedure can be used to generate the content carried by the IUCI.

When the first UE transmits the IUCI to the second UE, if the resource allocation mode 2 is used to transmit the IUCI, the resources used for transmitting the IUCI may also be determined according to a perception-based resource determination procedure. Thus for IUC technologies, a perception-based resource determination procedure can be used to determine the resources used to transmit the IUCI.

When the IUC is not introduced, in general, a UE performs a perception-based resource determination procedure for one data transmission, and the resource determination procedures used for different data transmissions are independent of each other. However, after the introduction of IUC, in order to ensure that the information indicated in the IUCI is available to UEs that receive the IUCI, there needs to be a certain limit between the time point when the IUCI is transmitted and the time range of the resources indicated in the IUCI. Therefore, in order to support IUC technologies in sidelink communication systems, it is necessary to determine how to handle the relationship between the above two types of perception-based resource determination procedures for different purposes, including timing relationships and other details.

Based on these, an embodiment of the present disclosure provides a method for how to transmit an IUC when the IUC is used in a sidelink communication system.

In order to make the purposes, technical solutions, and advantages of the present disclosure clearer, the technical solution of the present disclosure will be described in detail with specific embodiments. The following embodiments can be combined with each other, and the same or similar concepts or processes may not be repeated in some embodiments.

Figure 4:
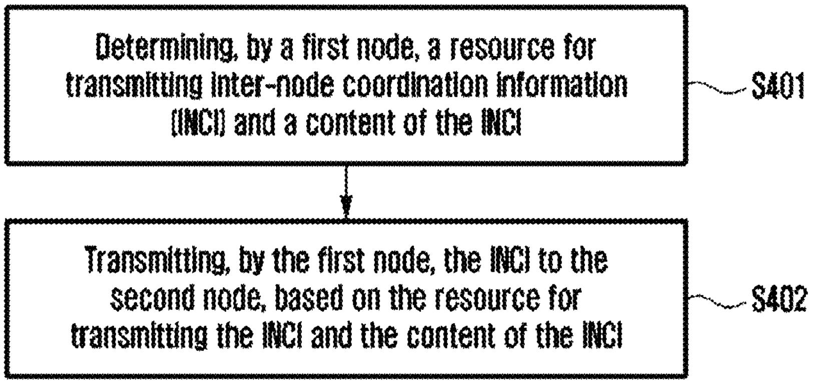
FIG. 4 is a schematic flowchart of a communication method provided by an embodiment of the present disclosure.

A sidelink communication method is provided in the embodiment of the present disclosure, as shown in FIG. 4, the method including:

Step S401: the first node determines a resource for transmitting inter-node coordination information (INCI) and the content of the INCI;

In the embodiment of the present disclosure, the inter-node coordination may be referred to the coordination between UEs, the coordination between the UE and the base station, or the coordination between the base stations. That is, the nodes in the embodiment of the present disclosure are nodes including a base station and a UE.

Specifically, when the first node and the second node are UEs, the inter-node coordination information (INCI) is inter-UE coordination information (IUCI).

In the embodiment of the present disclosure, the content of the INCI includes information related to channel status and/or radio interference, such as preferred/non-preferred resources, or resources for which conflict has occurred/is expected to occur. Specifically, the content of the INCI may include one or more resource subsets, resources preferred by a corresponding node, resources not preferred by the node, detected conflicts, and expected conflicts.

In this embodiment of the present disclosure, the content of the INCI may be determined based on a perception result of the first node. The resource for transmitting the INCI may also be determined based on a sensing result of the first node in resource allocation mode 2.

Step S402: the first node transmits the INCI to a second node, based on the resource for transmitting the INCI and the content of the INCI.

In this embodiment of the present disclosure, the first node transmits the INCI to the second node, so that the second node can determine the resource for transmitting the sidelink signal/channel based on this, for example, to generate based on the preferred resource, a candidate resource set of resources for transmitting the sidelink signal/channel, and/or to exclude resources from the generated candidate resource set based on non-preferred resources, so as to improve reliability of sidelink transmission in the second node.

In one embodiment, if the second UE transmits sidelink data to the first UE, or the second UE expects to transmit sidelink data to the first UE, then the first UE transmits the IUCI to the second UE. In this embodiment, the first UE or the second UE may also be replaced by a base station.

In this embodiment of the present disclosure, taking the first node as a UE for example, a physical layer of the UE may determine transmission resources and/or preferred resources and/or non-preferred resources, and may determine a transmission resource set for inter-UE coordination (IUC) including one or more resources. The determined transmission resource set may be reported by the physical layer of the UE to a higher layer such as an RRC/MAC layer, and the higher layer may select resources for PSSCH/PSCCH transmission from the set.

In resource allocation mode 2 (that is, the mode in which the UE autonomously selects transmission resources), the above process may be required by the high layer of the UE, for example, the higher layer may trigger the physical layer to perform a process of determining the resource subset, by providing parameters such as a resource pool, physical layer priority, remaining packet delay budget (remaining PDB).

The sidelink communication method provided in the embodiments of the present disclosure, realizes accurate and efficient generation of INCI based on a suitable time-frequency resource range, by determining a content of INCI and determining a resource for transmitting the INCI, and transmits the INCI to a node that needs the information within a suitable time range, such that other nodes can use the INCI in the time range that meets their needs in the process of determining transmission resources to the other nodes, so as to effectively improve reliability of a sidelink communication system without over-increasing overhead.

The embodiment of the present disclosure provides a method for determining resources for transmitting the INCI based on perception and a method for determining content of INCI based on perception.

In the embodiment of the present disclosure, in Step S401, determining the resource for transmitting the INCI and the content of the INCI, comprises at least one of the following:

A resource for transmitting the INCI is determined by a first resource selection window (RSW), and the content of the INCI is determined by a second RSW, that is, the resource for transmitting the INCI and the content of the INCI are determined by two perception-based resource determination procedures, respectively; and/or, in a process of perception-based resource determination, two RSWs are used for the resource for transmitting the INCI and the content of the INC, respectively.

The resource for transmitting the INCI and the content of the INC are determined by a third RSW, that is, the resource for transmitting the INCI and the content of the INC are determined by one perception-based resource determination procedure; and/or, one RSW are used for the resource for transmitting the INCI and the content of the INC, in a perception-based resource determination procedure.

In this embodiment of the present disclosure, if the first RSW is [n+T1, n+T2], determining the resource for transmitting the INCI according to the first RSW, includes:

- determining a value of T1 and/or T2 for the first RSW; and
- determining, according to the determined first RSW, the resource for transmitting the INCI.

In this embodiment of the present disclosure, if the second RSW is [n+T1, n+T2], determining the content of the INCI according to the second RSW, includes:

determining the value of T1 and/or T2 for the second RSW; and determining, according to the determined second RSW, the content of the INCI.

In this embodiment of the present disclosure, if the third RSW is [n+T1, n+T2], determining the resource for transmitting the INCI and the content of the INCI according to the third RSW, includes:

determining the value of T1 and/or T2 for the third RSW; and determining, according to the determined third RSW, the resource for transmitting inter-node coordination information (INCI) and a content of the INCI.

In this embodiment of the present disclosure, if the first RSW or the second RSW or the third RSW is [n+T1, n+T2], determining the resource for transmitting the INCI and/or determining the content of the INCI according to the RSW, further includes:

determining a value of T1 and/or T2 based on at least one of the following:

a parameter related to the INCI;

a value of the parameter related to the INCI;

a remaining packet delay budget (PDB) of a transmission of the second node;

time when the second node is triggered to perform a resource determination procedure;

a starting position of the RSW of the second node;

an end position of the RSW of the second node;

a size range of the RSW of the second node;

a position and/or a number of candidate resources of the second node;

a position and/or a number of candidate time units of the second node;

remaining PDBs indicated by a higher layer;

a node processing delay; and validity of the INCI.

In this embodiment of the present disclosure, the transmission of the second node may be referred to as sidelink transmission of the second node, and the same part thereof will not be repeated hereinafter.

In this embodiment of the present disclosure, the time unit may specifically be a slot.

In this embodiment of the present disclosure, determining the value of T1 and/or T2 based on the validity of the INCI, comprises at least one of the following:

determining that a value of n+T1 and/or n+T2 is not less than a difference between the time unit in which the second node is triggered to perform the resource determination procedure and a first predetermined time length;

determining that the value of n+T1 and/or n+T2 of the first RSW is not less than a difference between the starting position or the end position of the second RSW and a second predetermined length of time;

determining that the value of n+T1 and/or n+T2 of the second RSW is not larger than a sum of the starting position or the end position of the first RSW and the second predetermined length of time;

determining that the value of n+T1 and/or n+T2 of the first RSW is not less than a difference between the position of the preferred resource and/or the non-preferred resource selected by the first node in the second RSW and the second predetermined length of time; and determining that the value of n+T1 and/or n+T2 of the second RSW is not larger than a sum of the resource and/or a candidate resource for transmitting the INCI in the first RSW selected by the first node and the second predetermined length of time;

wherein, the first predetermined time and the second predetermined time are time lengths corresponding to a time validity of the INCI.

In this embodiment of the present disclosure, if the first RSW or the second RSW is [n+T1, n+T2], determining the resource for transmitting the INCI according to the first RSW or determining the content of the INCI according to the second RSW, further includes:

determining the value of T1 and/or T2 of another RSW according to at least one of the following of one RSW of the first RSW and the second RSW:

a starting position;

an end position;

a size range.

In this embodiment of the present disclosure, if the first RSW or the second RSW is [n+T1, n+T2], the first RSW and the second RSW may correspond to the same or different T1s, or correspond to the same or different T2s.

In this embodiment of the present disclosure, the time interval between the time unit where the resource for transmitting the INCI is located and the time unit where the earliest resource indicated in the INCI is located is not less than a node processing delay; and/or, the time interval between the end position of the first RSW and the time unit where the earliest resource indicated in the INCI is located is not less than the node processing delay; and/or, the time interval between the time unit where the resource for transmitting the INCI is located and the starting position of the RSW of the second node is not less than the node processing delay; and/or, the time interval between the time unit where the resource for transmitting the INCI is located and the time when the second node is triggered to perform the resource determination procedure is not less than the node processing delay; and/or, the time interval between the end position of the first RSW and the starting position of the RSW of the second node is not less than the node processing delay; and/or, the time interval between the end position of the first RSW and the time when the second node is triggered to perform the resource determination procedure is not less than the node processing delay;

wherein, the node processing delay includes the sum of at least one of the following:

a delay for the node to decode the INCI;

a delay for the node to use information indicated in the INCI;

a delay for the node to generate and transmit data; and a delay for the node to process a sensing result.

In this embodiment of the present disclosure, the parameter related to the INCI, comprises at least one of the following:

a time range in which the first node transmits the INCI;

a time range in which the second node receives the INCI;

the starting position and/or the end position of the RSW of the INCI of the first node;

a size range of the RSW of the INCI of the first node.

In this embodiment of the present disclosure, the RSW of the INCI of the first node may be the first RSW and/or the second RSW and/or the third RSW of the first node.

In this embodiment of the present disclosure, determining the value of T1 and/or T2 according to the parameter related to the INCI, comprises at least one of the following:

determining that the value of n+T1 is not less than a starting position of a time range in which the first node transmits the INCI or a starting position of a time range in which the second node receives the INCI;

determining that the value of n+T2 is not larger than an end position of the time range in which the first node transmits the INCI or an end position of the time range in which the second node receives the INCI;

[n+T1, n+T2] is the time range for transmitting the INCI indicated by the second node, or a subset thereof;

determining that the value of n+T2 of the first RSW is not larger than a difference between the starting position of the second RSW and a first offset, wherein the first offset corresponds to the node processing delay; and determining that the value of n+T1 of the second RSW is not less than a sum of the end position of the first RSW and the first offset, wherein the first offset corresponds to the node processing delay.

In this embodiment of the present disclosure, determining the value of T1 and/or T2 according to the remaining PDB of the transmission of the second node, comprises at least one of the following:

determining that the value of T1 and/or T2 is not larger than a difference between the remaining PDB of the transmission of the second node and a second offset, wherein the second offset is determined according to at least one of the following:

a size range of the RSW of the second node;

a size range of the RSW of the first node;

a node processing delay.

In this embodiment of the present disclosure, determining the value of T2 according to the starting position and/or the end position of the RSW of the second node, comprises at least one of the following:

determining that the value of n+T2 of the first RSW is not larger than a difference between the starting position of the RSW of the second node and a third offset, wherein the third offset corresponds to the node processing delay; and determining that the value of n+T2 of the first RSW is not larger than a difference between the end position of the RSW of the second node and a fourth offset, wherein the fourth offset corresponds to the length of the RSW of the second node, and/or the size range of the RSW of the second node, and/or the node processing delay of the second node.

In this embodiment of the present disclosure, determining the value of T2 according to the position and/or the number of candidate resources of the second node, or the position and/or the number of candidate time units of the second node, comprises at least one of the following:

determining that the value of n+T2 of the first RSW is not larger than a difference between the time unit where the earliest one of the candidate resources of the second node is located and a fifth offset, wherein the fifth offset corresponds to the node processing delay;

determining that the value of n+T2 of the first RSW is not larger than a difference between the earliest time unit in the candidate time units of the second node and the fifth offset; and determining that the value of n+T2 of the first RSW is not larger than a value obtained by subtracting second information from first information and then subtracting a sixth offset, wherein the first information is the end position of the RSW of the second node or "n+remaining PDBs" of the RSW of the second node, and the second information is a minimum number of candidate resources or candidate time units of the second node.

Further, in this embodiment of the present disclosure, the first node performs sensing based on the determined RSW, and generates a candidate resource set, excludes candidate resources having interference or inapplicable candidate resources from the candidate resource set based on the sensing result and its own transmission, determines whether to adjust a RSRP threshold based on whether the number of candidate resources after the exclusion meets the threshold, and reports the generated candidate resource set to the high layer. And, the first node determines preferred resources based on the generated candidate resource set, and/or determines non-preferred resources based on resources after exclusion, finally generates the INCI, and transmits the INCI to the second node on the determined resources for transmitting the INCI.

In the embodiment of the present disclosure, determining the resource for transmitting inter-node coordination information (INCI) and/or determining the content of the INCI, comprises at least one of the following:

triggering to determine the resource for transmitting the INCI and/or determine the content of the INCI according to the request signaling from the second node and/or the parameter indicated by the higher layer, wherein there is a predetermined offset between the parameter and a parameter used in a resource determination procedure for a resource not used for transmission or generating the transmission of the INCI.

In the embodiment of the present disclosure, determining the resource for transmitting the INCI and the content of the INCI, comprises at least one of the following:

determining, triggered by the request signaling of the second node, the resource for transmitting the INCI and/or the content of INCI;

determining, triggered by an indication of a higher layer, the resource for transmitting inter-node coordination information (INCI) and/or content of the INCI.

In the embodiment of the present disclosure, at least one of the following parameters indicated by signaling is requested:

a resource pool in which the second node performs transmission;

the priority of a transmission of the second node;

a remaining PDB of the transmission of the second node;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node;

a time range in which the first node transmits the INCI;

a time range in which the second node receives the INCI;

the starting position and/or the end position of the RSW of the INCI of the first node;

whether the second node supports or enables or disables re-evaluation;

whether the second node supports or enables or disables pre-emption;

a corresponding re-evaluated resource set or resource range transmitted by the second node; and a corresponding pre-empted resource set or resource range transmitted by the second node.

Wherein, re-evaluation, and pre-emption occurs after the UE has selected resources for sidelink transmission. Re-evaluation mainly refers to that the UE decides to give up the resources due to a detected conflict on the resources, when the UE has selected the resources for transmitting sidelink transmission and has not performed transmission on the resources, pre-emption is similar to re-evaluation, but mainly refers to that after the UE has reserved the resources for sidelink transmission in a scheme of signaling indication, the UE decides to give up using the resources after detecting a conflict on the resources.

In the embodiment of the present disclosure, the higher layer provides at least one of the following parameters:

a resource pool corresponding to the resource, reported by the first node to the higher layer;

the priority of the INCI of the first node;

the priority of a transmission of the second node;

remaining PDBs;

a time range in which the first node transmits the INCI;

a time range in which the second node receives the INCI;

the starting position and/or the end position of the RSW for transmitting the INCI;

the starting position and/or the end position of the RSW for determining the content of the INCI;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node.

In the embodiment of the present disclosure, the resource for transmitting the INCI is a physical sidelink feedback channel (PSFCH) resource, and the INCI is carried in the PSFCH.

In this embodiment of the present disclosure, the time unit may specifically be a slot or a symbol.

Optionally, it may be a PRB (Physical resource block) on a PSFCH slot, or a PRB on the last several symbols of a slot, similar to a PSFCH carrying HARQ-ACK feedback.

In the embodiment of the present disclosure, when the node enables the HARQ function and the IUC function simultaneously, it may be necessary to transmit/receive the PSFCH carrying HARQ-ACK feedback and the PSFCH carrying INCI simultaneously. A method of simultaneously transmitting/receiving PSFCH carrying HARQ-ACK feedback and PSFCH carrying INCI is provided hereinafter.

In the embodiment of the present disclosure, transmitting the INCI to the second node, comprises transmitting at least one of the following to the second node:

at least one INCI with the highest priority in the INCI;

at least one HARQ-ACK with the highest priority among the HARQ-ACKs; and at least one INCI and/or HARQ-ACK with the highest priority among INCIs and HARQ-ACKs.

In the embodiment of the present disclosure, transmitting the INCI to the second node, comprises transmitting at least one of the following:

at least one PSFCH with the highest priority among PSFCHs carrying the INCI;

at least one PSFCH with the highest priority among the PSFCHs carrying the Hybrid Automatic Repeat Request-Acknowledge (HARQ-ACK); and at least one PSFCH with the highest priority among PSFCHs carrying the INCI and PSFCHs carrying HARQ-ACK.

In the embodiment of the present disclosure, a priority of the PSFCH carrying the INCI is determined according to at least one of the following:

a priority parameter indicated by a request signaling of the second node and/or indicated by a higher layer;

a priority parameter indicated in the sidelink control message (SCI) transmitted by the third node, wherein the third node is a node that triggers the first node to transmit the INCI;

INCI-specific priorities; and a priority offset corresponding to the INCI.

In the embodiment of the present disclosure, the method further includes: determining PSFCH to be transmitted, according to at least one of the priority of the PSFCH, a content carried by the PSFCH, a traffic type, and a HARQ-ACK feedback option based on groupcast.

In the embodiment of the present disclosure, determining PSFCH to be transmitted includes: prioritizing transmitting PSFCH carrying a specific content, for a specific traffic type or a specific HARQ-ACK feedback option of a groupcasted traffic.

In the embodiment of the present disclosure, determining PSFCH to be transmitted includes: determining the PSFCH to be transmitted according to a sum of the priority of the PSFCH and a ninth offset, for PSFCH carrying a specific content;

wherein the ninth offset is determined based on at least one of the content carried by the PSFCH, the traffic type, and the HARQ-ACK feedback option based on groupcast.

Hereinafter, taking the first node as the first UE and the second node as the second UE for example, the method for determining the resource for transmitting IUCI based on perception and determining the content of IUCI based on perception provided by the present disclosure will be described according to several specific embodiments in detail.

Embodiment 1A

A first UE determines the resource for transmitting the INCI and the content of the INCI by two perception-based resource determination procedures, respectively; and/or, in a process of perception-based resource determination, the first UE uses two RSWs to determine the resource for transmitting the INCI and the content of the INC, respectively.

In Embodiment 1A, a second UE may request the first UE to transmit IUCI. Specifically, to trigger this process, on a slot n, the first UE receives a request signaling from the second UE, wherein the request signaling is used to trigger the first UE to transmit the IUCI to the second UE. Specifically, the request signaling indicates at least one of the following parameters for determining the resource for transmitting the IUCI and/or determining the content of the IUCI, wherein the content of the IUCI includes a set of resources that the first UE prefers and/or does not prefer:

a resource pool in which the second UE (expected) performs transmission;

priority of sidelink transmission of the second UE;

the remaining PDBs for sidelink transmission of the second UE, wherein optionally, the remaining PDBs are corresponding to the slot n' in which (expected) sidelink transmission of the second UE is triggered, or corresponding to the slot n in which the first UE is triggered to transmit IUCI;

the slot n' in which the second UE is (expected) triggered to perform a resource determination procedure to determine a time point for sidelink transmission;

the starting position and/or the end position of the (expected) RSW of the second UE;

a size range of the (expected) RSW of the second UE, which may be determined by T2 min of the second UE, wherein T2 min is a parameter indicated by a higher layer for determining a minimum number of slots included in the (expected) RSW of the second UE, and may be indicated/determined based on priority;

a position and/or a number of (expected) candidate resources/candidate slots for the second UE;

the number of sub-channels used by sidelink transmission of the second UE;

a resource reservation interval $P_{rsvp\_TX}$ for sidelink transmission of the second UE;

the time range in which the first UE is expected to transmit the IUCI or the second UE is expected to receive the IUCI, including the earliest and/or latest time point, wherein the latest time point may be indicated by the remaining PDBs;

the starting position and/or the end position of the (expected) RSW of the IUCI of the first UE, wherein this RSW is used to determine the resources for transmitting the IUCI; and the starting position and/or the end position of the (expected) RSW used to determine the content of the IUCI of the first UE.

Optionally, the request signaling also includes: whether the second UE supports or enables/disables re-evaluation and/or pre-emption; and/or, a resource set or resource range corresponding to the re-evaluation and/or pre-emption for the sidelink transmission of the second UE, wherein the range may refer to a range in the frequency domain and/or the time domain.

Additionally/alternatively, in Embodiment 1A, the higher layer of the first UE may require the first UE to determine a resource subset, wherein the resource subset is used to enable the higher layer to determine the content of the IUCI based on itself, and the content includes a set of preferred and/or non-preferred resources of the first UE. Specifically, in order to trigger this process, on a slot n, the higher layer provides at least one of the following parameters for determining the resource for transmitting the IUCI and/or determining the content of the IUCI:

a resource pool, wherein the first UE reports the resources in the resource pool to the higher layer;

the priority of the IUCI of the first UE and/or the priority of sidelink transmission of the second UE;

remaining PDBs; optionally, the remaining PDBs are the remaining PDBs indicated by the second UE, or are determined based on the remaining PDBs of the second UE and/or the starting and/or end position of the RSW indicated by the second UE, wherein, the starting and/or end position of the RSW indicated by the second UE are RSW corresponding to transmission of the second UE; optionally, the remaining PDBs correspond to remaining PDBs at the latest time for transmitting IUCI;

the time range in which the first UE is expected to transmit the IUCI or the second UE is expected to receive the IUCI, including the earliest and/or latest time point, wherein the latest time point may be indicated by the remaining PDBs;

the starting position and/or the end position of the (expected) RSW for determining the content of the IUCI;

the starting position and/or the end position of the (expected) RSW for determining the content of the IUCI;

the slot n' in which the second UE is (expected) triggered to perform a resource determination procedure to determine a time point for sidelink transmission;

the starting position and/or the end position of the (expected) RSW of the second UE;

a size range of the (expected) RSW of the second UE, which may be determined by T2 min of the second UE, wherein T2 min is a parameter indicated by a higher layer for determining a minimum number of slots included in the (expected) RSW of the second UE, and may be indicated/determined based on priority;

a position and/or a number of (expected) candidate resources/candidate slots for the second UE;

the number of sub-channels used by sidelink transmission of the second UE; and a resource reservation interval $P_{rsvp\_TX}$ for sidelink transmission of the second UE.

Wherein, the remaining PDBs are used to determine the latest time for the UE to transmit sidelink data. For example, if the UE obtains the remaining PDBs on the slot n as P, the UE should complete transmission of sidelink data no later than on a slot n+P. For the remaining PDBs of the second UE obtained by the first UE, it needs to be considered whether the parameter is determined based on the time when the second UE obtains the remaining PDBs or the time when the first UE obtains the remaining PDBs.

An optional method is: the higher layer of the second UE indicates to the physical layer of the second UE in the slot n' that the value of the remaining PDB is P', and the second UE indicates the first UE to the first UE in the slot n that the value of the remaining PDB of the second UE is P, wherein P=n'+P'−n; the value of the remaining PDB of the second UE obtained by the first UE on a slot n is P, and the value of P is directly used in respective methods for using the remaining PDB of the second UE in embodiments of the present disclosure. This method can be understood as that the second UE has performed the mapping of the reference point of the remaining PDB from slot n' to the slot n, and the first UE can directly consider that the obtained time reference point corresponding to the remaining PDB of the second UE is the time point of this parameter.

Another optional method is: the higher layer of the second UE indicates to the physical layer of the second UE that the value of the remaining PDB is P' on a slot n', and the second UE indicates to the first UE on a slot n that the value of the remaining PDB of the second UE is P'; the first UE receives the information indicated by the second UE on the slot n and obtains the value of the remaining PDB of the second UE as P', and the time point of the second UE obtaining its own remaining PDB is slot n', then in the various methods for the first UE using the remaining PDB of the second UE in the embodiments of the present disclosure, the value of the remaining PDB of the second UE is P=n'+P'−n. This method can be understood as the first UE performing the mapping of the reference point of the remaining PDB from slot n' to slot n.

Which of the above methods to use can be determined based on the content indicated in the request signaling of the higher layer/second UE. For example, if the time point n' at which the second UE is triggered to perform the resource selection process is indicated, the latter method is used, otherwise the previous method is used; either is preset or configured.

In Embodiment 1A of the present disclosure, in order to determine the resource for transmitting the IUCI, the first UE determines $M_{total}$ candidate single-slot resources in one time interval [n+T1, n+T2] in the resource pool, including $L_{subCH}$ contiguous sub-channels in [n+T1, n+T2] which are assumed by the UE as candidate single-slot resources, wherein the time interval [n+T1, n+T2] is usually referred to as a resource selection window (RSW). For case of differentiation in this example, the RSW in which resources are determined to be used for transmitting the IUCI may be referred to as RSW-1, and the RSW of which the content of the ICUI (for example, the first UE determines its preferred and/or non-preferred resources based on perception) are determined may be referred to as RSW-2.

Determining, by the first UE, the values of T1 and T2, comprises at least one of the following:

- determining that the value of T1 and/or T2 is the value of the IUCI-related parameter indicated by the second UE in the request signaling, wherein the IUCI-related parameter may be time range in which the first UE is expected to transmit ICUI or the second UE is expected to receive IUCI, and/or the starting and/or end position of the (expected) RSW of IUCI of the first UE, indicated in the request signaling;
- determining the value of T1 and/or T2 based on the IUCI-related parameter indicated by the second UE in the request signaling;
- determining the value of T1 and/or T2 based on the remaining PDB for sidelink transmission of the second UE;
- determining the value of T1 and/or T2 based on the slot n' in which the second UE is (expected) triggered to perform a resource determination procedure to determine a time point for sidelink transmission;
- determining the value of T1 and/or T2 based on the starting and/or end position of the (expected) RSW of the second UE, and/or the size range of the RSW; and
- determining the value of T1 and/or T2 based on the position and/or the number of (expected) candidate resources/candidate slots for the second UE.

Additionally/alternatively, it also includes at least one of the following:

- determining that the value of T1 and/or T2 is the value of the IUCI-related parameter indicated by the higher layer, wherein the IUCI-related parameter may be the starting and/or end position of the (expected) RSW of IUCI indicated by the higher layer;
- determining the value of T1 and/or T2 based on the IUCI-related parameter indicated by the higher layer;
- determining the value of T1 and/or T2 based on the remaining PDB indicated by the higher layer;
- determining the value of T1 and/or T2 based on the slot n' in which the second UE is (expected) triggered to perform a resource determination procedure to determine a time point for sidelink transmission, indicated by the higher layer;
- determining the value of T1 and/or T2 based on the starting and/or end position of the (expected) RSW of the second UE, and/or the size range of the RSW, indicated by the higher layer; and
- determining the value of T1 and/or T2 based on the position and/or the number of (expected) candidate resources/candidate slots for the second UE, indicated by the higher layer.

Additionally/alternatively, it also includes at least one of the following:

- determining the value of T1 and/or T2 based on the starting and/or end position of RSW-2;
- determining the value of T1 and/or T2 based on the minimum size of RSW-2 (for example, the minimum value of candidate slots included in RSW-2; for another example, the minimum value of T2' and the minimum value of T2'−T1' in the slot index [n+T1', n+T2'] in RSW-2);
- determining the value of T1 and/or T2 based on the UE processing delay; and
- determining the value of T1 and/or T2 based on validity of IUCI.

Wherein, any one of the above-mentioned starting and/or ending position of RSW-2, the minimum size of RSW-2, UE processing delay, validity of IUCI may be (pre)configured or preset by the high-layer, and/or indicated in the request signaling of the second UE.

Wherein, determining the value of T1 and/or T2 based on validity of the IUCI includes: assuming that after the second UE receives the IUCI in the slot m, the second UE may judge whether the IUCI is available and/or whether the information indicated in the IUCI is available, including judging whether the time interval between the slot m for receiving the IUCI and the slot n' on which the second UE is triggered to perform the resource determination procedure to determine transmission resources is larger than a predetermined length delta1, wherein if the time interval is greater, the IUCI is considered as unavailable; and/or, judging whether the time interval between the slot m for receiving the IUCI and the slot m where any resource indicated in the IUCI is located is larger than a predetermined length delta2, wherein if the time interval is greater, the resource is considered as unavailable. Correspondingly, the value of T1 determined by the first UE is not less than n'-delta1, otherwise the IUCI may be transmitted prematurely, which will be considered unavailable by the second UE; and/or, the value of T1 determined by the first UE is not less than the end position of RSW-2 minus delta2, and/or not less than the preferred and/or non-preferred resource (which may be the latest one) selected by the UE in RSW-2 minus delta2, otherwise, the accuracy of all/part of the resources selected in RSW-2 may not be guaranteed due to out-date, and thus may be considered unavailable by the second UE.

In the above schemes, the method of determining the value of T1 and/or T2 based on the UE processing delay may be used in combination with other methods. For example, assuming that the second UE needs to determine transmission resources of the second UE, based on preferred and/or non-preferred resources indicated in the IUCI, after completing the reception of the IUCI, then the time interval between the slot where the resource for transmitting the IUCI is located/the end position of RSW-1 and the slot where the earliest resource indicated in the IUCI is located, should be not less than the UE processing delay, or the time interval between the slot where the resource for transmitting the IUCI is located/the end position of RSW-1 and the starting position of RSW of the second UE and/or the time point when the second UE is triggered to perform the resource determination procedure for sidelink transmission, should be not less the UE processing delay.

The UE processing delay includes the sum of any one or more of the following: a delay for the UE to decode the IUCI and/or use the information indicated in the IUCI, which may be indicated by $$T^{SL}_{proc,dec};$$

the processing delay for the UE to generate and transmit data (which may correspond to $$T^{SL}_{proc,1}, T^{SL}_{proc,1}$$

is a processing delay parameter, in units of slots, configured based on subcarrier spacing (SCS) of a bandwidth part (BWP)); and a delay for the UE to process a sensing result (which may correspond to $$T^{SL}_{proc,0}, T^{SL}_{proc,0}$$

is another processing delay parameter, in units of slots, configured based on SCS of a BWP).

The following will be described in conjunction with examples. In the following specific examples, the UE processing delay may be used (for example, the offset corresponding to/including the UE processing delay), which is not specifically pointed out that this method is also based on the processing delay.

For determining the value of T1 and/or T2 based on the IUCI-related parameters indicated by the second UE in the request signaling, a specific example is the value of T1 is not less than a starting position of the time range in which the first UE is expected to transmit IUCI or the second UE is expected to receive IUCI, and as another example, the value of T2 is not larger than an end position of (expected) RSW of the IUCI of the first UE indicated in the request signaling. This method may be considered as that [n+T1, n+T2] determined by the first UE is the time range or a subset thereof for transmitting IUCI indicated by the second UE in the request signaling. Another specific example is: the value of T2 is not larger than the starting position of the (expected) RSW (or RSW-2) for determining the content of the IUCI of the first UE minus a specific offset, wherein the offset may correspond to the processing delay, including the sum of any one or more of the processing delay for the second UE to decode IUCI, $$T^{SL}_{proc,0}, \text{ and } T^{SL}_{proc,1}.$$

For determining the value of T2 based on the remaining PDB for sidelink transmission of the second UE, a specific example is: the value of T2 is not larger than the remaining PDB for sidelink transmission of the second UE minus a specific offset, wherein the offset may be determined according to the size range of (expected) RSW of the second UE and/or the size range of (expected) RSW of the first UE and/or the UE processing delay.

Figure 5:
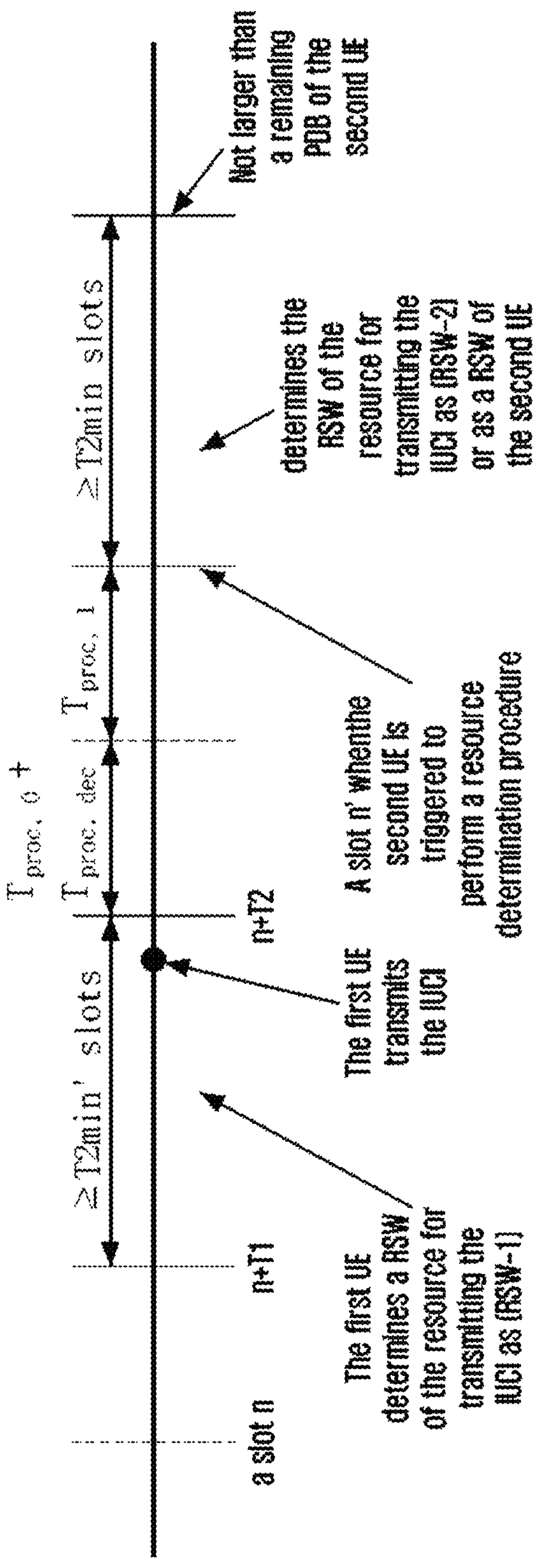
FIG. 5 is a schematic diagram of a specific example of Embodiment 1A provided by an embodiment of the present disclosure.

For example, as shown in FIG. 5, T2 is less than or equal to the remaining PDB for sidelink transmission of the second UE–T2 min–

$$T^{SL}_{proc,1} - T^{SL}_{proc,0} - T^{SL}_{proc,dec}$$

or remaining PDB'–T2 min'–

$$T^{SL}_{proc,0} - T^{SL}_{proc,dec},$$

and/or, T1 is less than or equal to the remaining PDB for sidelink transmission of the second UE–T2min–T2min'–

$$T^{SL}_{proc,1} - T^{SL}_{proc,dec}$$

or remaining PDB–T2 min–T2 min'–

$$T^{SL}_{proc,0} - T^{SL}_{proc,dec};$$

wherein, $$T^{SL}_{proc,0}, T^{SL}_{proc,1}, \text{ and } T^{SL}_{proc,dec}$$

are UE processing delay, and $$T^{SL}_{proc,dec}$$

corresponds to the processing delay of the second UE decoding IUCI; T2 min corresponds to the size of (expected) RSW of the second UE, which can be indicated by the second UE in the request signaling, and its value or configuration can correspond to the priority for sidelink transmission of the second UE; T2 min' corresponds to the size of (expected) RSW of the first UE, which may be indicated or (pre)configured by the high layer of the first UE, and its value or configuration may correspond to the IUCI or a specific priority of transmitting IUCI.

For determining the value of T2 based on the range of the starting and/or end position of (expected) RSW of the second UE and/or the size range of RSW, a specific example is: the value of T2 is not larger than the starting position of (expected) RSW of the second UE minus a specific offset, wherein the offset may correspond to the UE processing delay, including the sum of one or more of the processing the delay of decoding IUCI, $$T^{SL}_{proc,0}, \text{ and } T^{SL}_{proc,1};$$

and/or the value of T2 is not larger than the end position of (expected) RSW of the second UE minus a specific offset, wherein the offset may correspond to the RSW length and the UE processing delay, including the sum of one or more of T2 min, the size range of RSW, the processing delay of decoding IUCI, $$T^{SL}_{proc,0}, \text{ and } T^{SL}_{proc,1}.$$

For determining the value of T1 and/or T2 based on the position and/or the number of (expected) candidate resources/candidate slots of the second UE, a specific example is: the value of T2 is not larger than $$t_{y0}^{SL}$$

minus a specific offset, wherein $$t_{y0}^{SL}$$

is the slot where the earliest one of (expected) candidate resources/candidate slots of the second UE is located, and the offset may correspond to the UE processing delay, and its value is similar to the other examples above. Another specific example is: the value of n+T2 is not larger than the end position of (expected) RSW of the second UE or "n+remaining PDBs" minus a minimum number Ymin of (expected) candidate resources/candidate slots of the second UE subtracting a specific offset, wherein the offset can correspond to the UE processing delay, and its value is similar to the other examples above.

Determining, by the first UE, the value of T1 based on at least one of the above methods, comprises at least one of the following:

- determining that the starting position of RSW-1 is not earlier than the first reference point plus/minus a specific offset, that is, T1 is not less than the first reference point plus/minus a specific offset;
- determining that the starting position of RSW-1 is not later than the second reference point plus/minus a specific offset, that is, T1 is not larger than the second reference point plus/minus a specific offset.

Wherein, the first reference point includes at least one of the following: a time point at which the second UE is (expected) triggered to perform a resource determination procedure to determine a resource for transmission (also denoted as a slot n' in this embodiment); the starting and/or end position of RSW of the second UE; the starting and/or end position of RSW-2; the time point where one or more of the preferred and/or non-preferred resources selected in RSW-2 is located (for example, a slot), optionally, as the time point of the earliest/latest one in time among the preferred and/or non-preferred resources selected in the RSW-2.

Wherein, the second reference point includes at least one of the following: a time point when the first UE is triggered to perform a resource determination procedure to transmit IUCI (also denoted as slot n in this embodiment); the end position n+T2 of RSW-1.

Wherein, the specific offset includes the sum of any one or more of the following: the time length of the validity of the corresponding IUCI (for example, delta1/delta2 in the above); the UE processing delay; minimum size threshold of RSW-1 and/or RSW-2 in time domain.

In a specific example, determining, by the first UE, the value of T1 in the starting position n+T1 of RSW-1, comprises at least one of the following:

T1>=0, and/or $$T1 <= T_{proc,1}^{SL};$$

T1<=T2−$S_{RSW\text{-}1,\ min}$, wherein $S_{RSW\text{-}1,\ min}$ is the minimum size threshold of RSW-1 in the time domain, and the unit thereof can be a slot;

The value of T1 is not less than the starting/end position of RSW-2 minus delta2, for example T1>=$T2_{RSW,2}$−delta2, wherein $T2_{RSW,2}$ is the end position n+$T2_{RSW,2}$ of the corresponding RSW-2, and delta2 is a parameter corresponding to the validity of the IUCI; further, $T2_{RSW,2}$ can also be replaced with the slot where the latest one in time of preferred and/or non-preferred resources selected in RSW-2 by the first UE is located, or be replace with another parameter for determining the starting/end position of RSW-2 or $T2_{RSW,2}$ in the embodiments hereinafter;

T1>=n'-delta1, wherein n' is the slot in which the second UE is (expected) triggered to perform the resource determination procedure to determine the transmission resource, and delta1 is a parameter corresponding to the validity of the IUCI.

Determining, by the first UE, the value of T2 based on at least one of the above methods, comprises at least one of the following:

- determining that the end position of RSW-1 is not later than the third reference point plus/minus a specific offset, that is, T2 is not larger than the third reference point plus/minus a specific offset;
- determining that the end position of RSW-1 is not earlier than the fourth reference point plus/minus a specific offset, that is, T2 is not less than the fourth reference point plus/minus a specific offset;
- determining the end position of RSW-1 no later than (n+remaining PDBs corresponding to IUCI) minus a certain offset and/or no later than (n+remaining PDBs corresponding to the second UE's transmission) minus a certain offset, that is, T2 is not larger than the remaining PDBs corresponding to the IUCI and/or the remaining PDBs corresponding to the transmission of the second UE minus a certain offset.

Wherein, the third reference point includes at least one of the following: a time point at which the second UE is (expected) triggered to perform a resource determination procedure to determine a resource for transmission (also denoted as a slot n' in this embodiment); the starting and/or end position of RSW of the second UE; the starting and/or end position of RSW-2; the time point where one or more of the preferred and/or non-preferred resources selected in RSW-2 is located (for example, a slot), optionally, as the time point of the earliest/latest one in time among the preferred and/or non-preferred resources selected in the RSW-2.

Wherein, the fourth reference point includes at least one of the following: a time point when the first UE is triggered to perform a resource determination procedure to transmit IUC (also denoted as slot n in this embodiment); the starting position n+T1 of RSW-1.

Wherein, the specific offset includes the sum of any one or more of the following: the UE processing delay; minimum size threshold of RSW-1 and/or RSW-2 in time domain; and the minimum threshold of T2.

Wherein, when the fourth reference point is slot n or n+T1 and the specific offset is the minimum size threshold of RSW-1 in the time domain or the minimum threshold of T2, optionally, only when the fourth reference point plus the specific offset is not larger than "n+remaining PDBs", the UE determines that T2 is not less than the fourth reference point plus the specific offset and T2 is still less than or equal to the remaining PDBs.

In a specific example, determining, by the first UE, the value of T2 in the end position n+T2 of RSW-1, comprises at least one of the following:

T2>=T1+minimum size threshold of RSW-1 in time domain;

T2<=remaining PDBs and/or T2>=minimum threshold of T2;

The value of T2 is not larger than the starting position of RSW-1 minus $$T^{SL}_{proc,X},$$

for example $$T2 <= T1_{RSW,2} - T^{SL}_{proc,X},$$

wherein $T1_{RSW,2}$ is the parameter corresponding to the starting position $n+T1_{RSW,2}$ of RSW-2, $$T^{SL}_{proc,X}$$

corresponds to the UE processing delay, which can be the sum of any one or more of $$T^{SL}_{proc,1},\ T^{SL}_{proc,0},\ \text{and}\ T^{SL}_{proc,dec},\ \text{and}\ T^{SL}_{proc,dec}$$

corresponds to the processing delay for the second UE to decode IUCI; further, $T1_{RSW,2}$ can also be replaced with the slot in which the earliest one of preferred and/or non-preferred resources selected in RSW-2 by the first UE, or with the time point in which the second UE is (expected) triggered to perform the resource determination procedure to determine resources for transmission, or may be replaced with another parameter for determining the starting position of RSW-2 or $T1_{RSW,2}$ in embodiments hereinafter.

The first UE performs sensing based on the determined RSW, and generates a candidate resource set, excludes candidate resources having interference or inapplicable candidate resources from the candidate resource set based on the sensing result and its own transmission, determines whether to adjust a RSRP threshold based on whether the number of candidate resources after the exclusion meets the threshold, and finally reports the generated candidate resource set to the high layer.

In embodiment 1A, the UE further determines the content of the IUCI, which includes one or more resource subsets, resources preferred by a corresponding UE, resources not preferred by the UE, detected conflicts, and expected conflicts. Specifically, to trigger this process, on a slot n, the first UE receives a request signaling from the second UE, wherein the request signaling is used to trigger the first UE to transmit the IUCI to the second UE; and/or, the higher layer of the UE triggers the first UE to determine the content of the IUCI. The content indicated in the above request signaling and the content indicated to the first UE by the higher layer of the first UE to trigger the first UE to determine the content of the IUCI are similar to the process in which the UE is triggered to determine the resource for transmitting the IUCI, which will not be repeated herein.

The request signaling for triggering the UE to determine the IUCI and the request signaling for triggering the UE to determine the resource for transmitting the IUCI may be the same or different. Preferably, in this embodiment, in order to reduce the overhead caused by transmitting the request signaling, the above two request signalings are the same signaling. When the above two request signalings are the same signaling, the parameter for triggering the UE to determine the IUCI and the request signaling for triggering the UE to determine the resource for transmitting the IUCI indicated in the request signaling may be the same or different or partially overlapping.

The higher layer parameter for triggering the UE to determine the IUCI and the higher layer parameter for triggering the UE to determine the resource for transmitting the IUCI may be the same or different. Preferably, in this embodiment, since the high layer signaling is a signaling for coordination between modules within the UE, it can be considered that the signaling does not constitute overhead, so that different parameters are used to transmit and determine the IUCI more flexibly. Further, the high layer parameter used to trigger the UE to determine the IUCI and the high layer parameter used to trigger the UE to determine the resource for transmitting the IUCI include different parameters, and may be indicated to the physical layer by the high layer at different time points.

To determine the content of the IUCI, the first UE determines, based on perception, resources preferred and/or non-preferred for itself. Specifically, the first UE determines total $M_{total}'$ candidate single-slot resources in one time interval [n+T1', n+T2'], including any consecutive $L_{subCH}$ sub-channels in [n+T1', n+T2'] assumed by the UE as candidate single-slot resources. In this example, for the convenience of distinction, the time interval [n+T1', n+T2'] is referred to as RSW-2. Determining, by the first UE, the values of T1' and T2', comprises at least one of the following:

determining that the value of T1' and/or T2' is the value of the IUCI-related parameter indicated in the request signaling by the second UE, wherein the IUCI-related parameter may the starting and/or end position of (expected) RSW for determining the content of IUCI of the first UE;

determining the value of T1' and/or T2' based on the IUCI-related parameter indicated by the second UE in the request signaling;

determining the value of T1' and/or T2' based on the remaining PDB for sidelink transmission of the second UE;

determining the value of T1' and/or T2' based on the slot n' in which the second UE is (expected) triggered to perform a resource determination procedure to determine a time point for sidelink transmission;

determining the value of T1' and/or T2' based on the starting and/or end position of the (expected) RSW of the second UE, and/or the size range of the RSW; and determining the value of T1' and/or T2' based on the position and/or the number of (expected) candidate resources/candidate slots for the second UE.

Additionally/alternatively, it also includes at least one of the following:

determining that the value of T1' and/or T2' is the value of the IUCI-related parameter indicated by the higher layer, wherein the IUCI-related parameter may be the starting and/or end position of the (expected) RSW for determining the content of IUCI indicated by the higher layer;

determining the value of T1' and/or T2' based on the IUCI-related parameter indicated by the higher layer;

determining the value of T1' and/or T2' based on the remaining PDB indicated by the higher layer;

determining the value of T1' and/or T2' based on the slot n' in which the second UE is (expected) triggered to perform a resource determination procedure to determine a time point for sidelink transmission, indicated by the higher layer;

determining the value of T1' and/or T2' based on the starting and/or end position of the (expected) RSW of the second UE, and/or the size range of the RSW, indicated by the higher layer; and determining the value of T1' and/or T2' based on the position and/or the number of (expected) candidate resources/candidate slots for the second UE, indicated by the higher layer.

Additionally/alternatively, it also includes at least one of the following:

determining the value of T1' and/or T2' based on the starting and/or end position of RSW-1;

determining the value of T1' and/or T2' based on the minimum size of RSW-1 (for example, the minimum value of candidate slots included in RSW-1; for another example, the minimum value of T2 and the minimum value of T2−T1 in the slot index [n+T1, n+T2] in RSW-1);

determining the value of T1' and/or T2' based on the UE processing delay; and determining the value of T1' and/or T2' based on validity of IUCI.

Wherein, any one of the above-mentioned starting and/or ending position of RSW-1, the minimum size of RSW-1, UE processing delay, validity of IUCI may be (pre)configured or preset by the high-layer, and/or indicated in the request signaling of the second UE.

Wherein, determining the value of T1' and/or T2' based on validity of the IUCI includes: assuming that after the second UE receives the IUCI in the slot m, the second UE may judge whether the IUCI is available and/or whether the information indicated in the IUCI is available, including judging whether the time interval between the slot m for receiving the IUCI and the slot n' on which the second UE is triggered to perform the resource determination procedure to determine transmission resources is larger than a predetermined length delta1, wherein if the time interval is greater, the IUCI is considered as unavailable; and/or, judging whether the time interval between the slot m we for receiving the IUCI and the slot m where any resource indicated in the IUCI is located is larger than a predetermined length delta2, wherein if the time interval is greater, the resource is considered as unavailable. Accordingly, the value of T1' and/or T2' determined by the first UE is not less than n'-delta1 (or not less than n'-delta1 minus the UE processing delay and then minus the minimum size threshold of RSW-1 or the minimum value of parameter T2 of RSW-1), otherwise there will be insufficient time for RSW-1; and/or, the value of T1' and/or T2' determined by the first UE is not larger than that the end position of RSW-1 plus delta2 and/or not larger than the resource or candidate resource (which can be the latest candidate resource) selected by the UE for IUCI transmission in RSW-1 plus delta2, otherwise the accuracy of all/part of the resources selected in RSW-2 may not be guaranteed due to out-date, and thus may be considered unavailable by the second UE.

In the above schemes, the method of determining the value of T1' and/or T2' based on the UE processing delay may be used in combination with other methods. For example, assuming that the second UE needs to determine transmission resources of the second UE, based on preferred and/or non-preferred resources indicated in the IUCI, after completing the reception of the IUCI, then the time interval between the slot where the resource for transmitting the IUCI is located/the end position of RSW-1 and the starting position of RSW-2 and/or the slot where the earliest one of the preferred and/or non-preferred resources determined in RSW by the first UE is located, should be not less than the UE processing delay, or the time interval between the slot where the resource for transmitting the IUCI is located/the end position of RSW-1 and the starting position of RSW of the second UE and/or the time point when the second UE is triggered to perform the resource determination procedure for sidelink transmission, should be not less the UE processing delay.

The UE processing delay includes the sum of any one or more of the following: a delay for the UE to decode the IUCI and/or use the information indicated in the IUCI, which may be indicated by $$T^{SL}_{proc,dec};$$

the processing delay for the UE to generate and transmit data (which may correspond to $$T^{SL}_{proc,1}, T^{SL}_{proc,1}$$

is a processing delay parameter, in units of slots, configured based on subcarrier spacing (SCS) of a bandwidth part (BWP)); and a delay for the UE to process a sensing result (which may correspond to $$T^{SL}_{proc,0}, T^{SL}_{proc,0}$$

is another processing delay parameter, in units of slots, configured based on SCS of a BWP).

The following will be described in conjunction with examples. In the following specific examples, the UE processing delay may be used (for example, the offset corresponding to/including the UE processing delay), which is not specifically pointed out that this method is also based on the processing delay.

Determining, by the first UE, the value of T1' based on at least one of the above methods, comprises at least one of the following:

determining that the starting position of RSW-2 is not earlier than the first reference point plus/minus a specific offset, that is, T1' is not less than the first reference point plus/minus a specific offset;

determining that the starting position of RSW-2 is not later than the second reference point plus/minus a specific offset, that is, T1' is not larger than the second reference point plus/minus a specific offset.

Wherein, the first reference point includes at least one of the following: a time point at which the second UE is (expected) triggered to perform a resource determination procedure to determine a resource for transmission (also denoted as a slot n' in this embodiment); the starting and/or end position of RSW of the second UE; the starting and/or end position of RSW-1; the time point where one or more of the resources selected for transmitting IUCI in RSW-1, or the candidate resources selected for transmitting IUCI in RSW-1, is located (for example, a slot), optionally, as the time point of the earliest/latest one in time among the candidate resources for transmitting IUCI in the RSW-1.

Wherein, the second reference point includes at least one of the following: a time point when the first UE is triggered to perform a resource determination procedure to transmit IUC (also denoted as slot n in this embodiment); the end position n+T2' of RSW-2.

Wherein, the specific offset includes the sum of any one or more of the following: the time length of the validity of the corresponding IUCI (for example, delta1/delta2 in the above); the UE processing delay; minimum size threshold of RSW-1 and/or RSW-2 in time domain.

In a specific example, determining, by the first UE, the value of T1' in the starting position n+T1' of RSW-2, comprises at least one of the following:

T1'>=T2, and/or $$T1' <= T2 + T^{SL}_{proc,1},$$

wherein T2 is a parameter corresponding to the end position n+T2 of RSW-1;

T1'<=T2'−$S_{RSW\ 2,\ min}$, wherein $S_{RSW\text{-}2,\ min}$ is the minimum size threshold of RSW-2 in the time domain, and the unit thereof can be a slot;

The value of T1' is not less than the end position of RSW-1 plus $$T^{SL}_{proc,X},$$

for example, $T2_{RSW,1}$ is a parameter corresponding to the end position of RSW-1 plus n+$T2_{RSW,1}$, $$T^{SL}_{proc,X}$$

corresponds to the UE processing delay, which may the sum of any one or more of $$T^{SL}_{proc,1},\ T^{SL}_{proc,0},\ \text{and}\ T^{SL}_{proc,dec},\ \text{and}\ T^{SL}_{proc,dec}$$

corresponds to the processing delay for the second UE to decode IUCI; further, $T2_{RSW,1}$ may also be replaced with the slot where the earliest/latest one in time of resources/candidate resources for transmitting IUCI selected in RSW-1 by the first UE is located, or the time point in which the second UE is (expected) triggered to perform the resource determination procedure to determine resources for transmission, or may be replaced with another parameter for determining the end position of RSW-1 or $T2_{RSW,1}$ in embodiments hereinafter.

Determining, by the first UE, the value of T2' based on at least one of the above methods, comprises at least one of the following:

determining that the end position of RSW-2 is not later than the third reference point plus/minus a specific offset, that is, T2' is not larger than the third reference point plus/minus a specific offset;

determining that the end position of RSW-2 is not earlier than the fourth reference point plus/minus a specific offset, that is, T2' is not less than the fourth reference point plus/minus a specific offset;

determining the end position of RSW-2 no later than (n+remaining PDBs corresponding to IUCI) minus a certain offset and/or no later than (n+remaining PDBs corresponding to the second UE's transmission) minus a certain offset, that is, T2' is not larger than the remaining PDBs corresponding to the IUCI plus a certain offset and/or the remaining PDBs corresponding to the transmission of the second UE minus.

Wherein, the third reference point includes at least one of the following: a time point at which the second UE is (expected) triggered to perform a resource determination procedure to determine a resource for transmission (also denoted as a slot n' in this embodiment); the starting and/or end position of RSW of the second UE; the starting and/or end position of RSW-1; the time point where one or more of the resources selected for transmitting IUC in RSW-1, or the candidate resources selected for transmitting IUC in RSW-1, is located (for example, a slot), optionally, as the time point of the earliest/latest one in time among the candidate resources for transmitting IUC in the RSW-1.

Wherein, the fourth reference point includes at least one of the following: a time point when the first UE is triggered to perform a resource determination procedure to transmit IUCI (also denoted as slot n in this embodiment); the starting position n+T1' of RSW-2.

Wherein, the specific offset includes the sum of any one or more of the following: the time length of the validity of the corresponding IUCI (for example, delta1/delta2 in the above); the UE processing delay; minimum size threshold of RSW-1 and/or RSW-2 in time domain.

In a specific example, determining, by the first UE, the value of T2' in the end position n+T2' of RSW-2, comprises at least one of the following:

T2' is not larger than the remaining PDBs of the corresponding IUCI plus a specified offset and/or corresponds to the remaining PDBs transmitted by the second UE;

T2'>=T1+$S_{RSW\text{-}2,\ min}$, wherein $S_{RSW\text{-}2,\ min}$ is the minimum size threshold of RSW-2 in the time domain, and the unit thereof can be a slot;

The value of T2' is not less than the starting/end position of RSW-1 plus delta2, for example T2'>=$T1_{RSW,1}$-delta2, wherein $T1_{RSW,1}$ is the starting position n+$T1_{RSW,1}$ of the corresponding RSW-1, and delta2 is a parameter corresponding to the validity of the IUCI; further, $T1_{RSW,1}$ can also be replaced with the slot where the latest one in time of resources or candidate resources for transmitting IUCI selected in RSW-1 by the first UE is located, or be replace with another parameter for determining the starting/end position of RSW-1 or $T1_{RSW,2}$ in the above embodiments;

T2'>=n'-delta1, wherein n' is the slot in which the second UE is (expected) triggered to perform the resource determination procedure to determine the transmission resource, and delta1 is a parameter corresponding to the validity of the IUCI.

The first UE performs sensing based on the determined RSW, and generates a candidate resource set, excludes candidate resources having interference or inapplicable candidate resources from the candidate resource set based on the sensing result and its own transmission, determines whether to adjust a RSRP threshold based on whether the number of candidate resources after the exclusion meets the threshold, and finally determines preferred resources based on the generated candidate resource set, and/or determines non-preferred resources based on resources after exclusion; the first UE finally generates the IUCI, and transmits the IUCI to the second UE on the determined resources in RSW-1 for transmitting the IUCI.

Embodiment 1B

A first UE determines the resource for transmitting the INCI and the content of the INCI by one perception-based resource determination procedure; and/or, in a process of the perception-based resource determination of the first UE, the first UE uses one resource selection window (RSW) to determine the resource for transmitting the INCI and the content of the INC.

In Embodiment 1B, a second UE requests the first UE to transmit IUCI. Specifically, to trigger this process, on a slot n, the first UE receives a request signaling from the second UE, wherein the request signaling is used to trigger the first UE to transmit the IUCI to the second UE. Specifically, the request signaling indicates at least one of the following parameters for transmitting the IUCI and/or determining the content of the IUCI, wherein the content of the IUCI includes a set of resources that the first UE prefers and/or does not prefer:

- a resource pool in which the second UE (expected) performs transmission;
- priority of sidelink transmission of the second UE;
- the remaining packet delay budgets (PDBs) for sidelink transmission of the second UE, wherein optionally, the remaining PDBs are corresponding to the slot n' in which (expected) sidelink transmission of the second UE is triggered, or corresponding to the slot n in which the first UE is triggered to transmit IUCI;
- the slot n' in which the second UE is (expected) triggered to perform a resource determination procedure to determine a time point for sidelink transmission;
- the starting and/or end position of the (expected) RSW of the second UE;
- a size range of the (expected) RSW of the second UE, which may be determined by T2 min of the second UE, wherein T2 min is a parameter indicated by a higher layer for determining a minimum number of slots included in the (expected) RSW of the second UE, and may be indicated/determined based on priority;
- a position and/or a number of (expected) candidate resources/candidate slots for the second UE;
- the number of sub-channels used by sidelink transmission of the second UE;
- a resource reservation interval $P_{rsvp\_TX}$ for sidelink transmission of the second UE;
- the time range in which the first UE is expected to transmit the IUCI or the second UE is expected to receive the IUCI, including the earliest and/or latest time point, wherein the latest time point may be indicated by the remaining PDBs.

Optionally, the request signaling also includes: whether the second UE supports or enables/disables re-evaluation and/or pre-emption; and/or, a resource set or resource range corresponding to the re-evaluation and/or pre-emption for the sidelink transmission of the second UE, wherein the range may refer to a range in the frequency domain and/or the time domain.

Additionally/alternatively, in Embodiment 1B, the higher layer of the first UE requests the first UE to determine a resource subset, wherein the resource subset is used to enable the higher layer to determine the content of the IUCI based on itself, and the content includes a set of preferred and/or non-preferred resources of the first UE. Specifically, in order to trigger this process, on a slot n, the higher layer provides at least one of the following parameters for transmitting the IUCI and/or determining the content of the IUCI:

- a resource pool, wherein the first UE reports the resources in the resource pool to the higher layer;
- the priority of the IUCI of the first UE and/or the priority of sidelink transmission of the second UE;
- remaining PDBs; optionally, the remaining PDBs are the remaining PDBs indicated by the second UE, or are determined based on the remaining PDBs of the second UE and/or the starting and/or end position of the RSW indicated by the second UE, wherein, the starting and/or end position of the RSW indicated by the second UE are RSW of the second UE;
- the time range in which the first UE is expected to transmit the IUCI or the second UE is expected to receive the IUCI, including the earliest and/or latest time point, wherein the latest time point may be indicated by the remaining PDBs;
- the slot n' in which the second UE is (expected) triggered to perform a resource determination procedure to determine a time point for sidelink transmission;
- the starting and/or end position of the (expected) RSW of the second UE;
- a size range of the (expected) RSW of the second UE, which may be determined by T2 min of the second UE, wherein T2 min is a parameter indicated by a higher layer for determining a minimum number of slots included in the (expected) RSW of the second UE, and may be indicated/determined based on priority;
- a position and/or a number of (expected) candidate resources/candidate slots for the second UE;
- the number of sub-channels used by sidelink transmission of the second UE;
- a resource reservation interval $P_{rsvp\_TX}$ for sidelink transmission of the second UE.

In order to determine the resource for transmitting the IUCI, the first UE determines $M_{total1}+M_{total2}$ candidate single-slot resources in one time interval [n+T1, n+T2] in the resource pool, including $L_{subCH}$ contiguous sub-channels in [n+T1, n+T2] which are assumed by the UE as candidate single-slot resources, wherein the time interval [n+T1, n+T2] is usually referred to as a resource selection window (RSW).

Determining, by the first UE, the values of T1 and T2, comprises at least one of the following:

- determining the value of T1 and/or T2 as a value of an IUCI-related parameter indicated by the second UE in the request signaling;
- determining the value of T1 and/or T2 based on the IUCI-related parameter indicated by the second UE in the request signaling;
- determining the value of T1 and/or T2 based on the remaining PDB for sidelink transmission of the second UE;
- determining the value of T1 and/or T2 based on the slot n' in which the second UE is (expected) triggered to perform a resource determination procedure to determine a time point for sidelink transmission;

determining the value of T1 and/or T2 based on the starting and/or end position of the (expected) RSW of the second UE, and/or the size range of the RSW; and determining the value of T1 and/or T2 based on the position and/or the number of (expected) candidate resources/candidate slots for the second UE.

Additionally/alternatively, it also includes at least one of the following:

determining the value of T1 and/or T2 as a value of an IUCI-related parameter indicated by the higher layer;

determining the value of T1 and/or T2 based on the IUCI-related parameter indicated by the higher layer;

determining the value of T1 and/or T2 based on the remaining PDB indicated by the higher layer;

determining the value of T1 and/or T2 based on the slot n' in which the second UE is (expected) triggered to perform a resource determination procedure to determine a time point for sidelink transmission, indicated by the higher layer;

determining the value of T1 and/or T2 based on the starting and/or end position of the (expected) RSW of the second UE, and/or the size range of the RSW, indicated by the higher layer; and determining the value of T1 and/or T2 based on the position and/or the number of (expected) candidate resources/candidate slots for the second UE, indicated by the higher layer.

Additionally/alternatively, it also includes at least one of the following:

based on any of the values of T1 and T2 and the minimum size of the RSW, determining the other of the values of T1 and T2;

determining the value of T1 and/or T2 based on the UE processing delay;

determining the value of T1 and/or T2 based on validity of IUCI.

Wherein, any one of the above-mentioned minimum size of RSW, UE processing delay, validity of IUCI may be (pre)configured or preset by the high-layer, and/or indicated in the request signaling of the second UE.

Wherein, determining the value of T1 and/or T2 based on validity of the IUCI includes: assuming that after the second UE receives the IUCI in the slot m, the second UE may judge whether the IUCI is available and/or whether the information indicated in the IUCI is available, including judging whether the time interval between the slot m for receiving the IUCI and the slot n' on which the second UE is triggered to perform the resource determination procedure to determine transmission resources is larger than a predetermined length delta1, wherein if the time interval is greater, the IUCI is considered as unavailable; and/or, judging whether the time interval between the slot $m_{IUCI}$ for receiving the IUCI and the slot m where any resource indicated in the IUCI is located is larger than a predetermined length delta2, wherein if the time interval is greater, the resource is considered as unavailable. Accordingly, the values of T1 and/T2 determined by the first UE should conform to at least one of the following:

$$T1 >= n' - \text{delta1};$$

$$T1 >= T2 - \text{delta2 (and vice versa, } T2 <= T1 + \text{delta2});$$

the value of T1 is not less than the preferred and/or non-preferred resource (which may be the latest one) selected by the UE in the RSW minus delta2;

the value of T2 is not larger than the preferred and/or non-preferred resource (which may be the earliest one) selected by the UE in the RSW plus delta2.

Otherwise, it may cause the IUCI to be transmitted prematurely, which thus the second UE may consider the IUCI as unavailable, or cause the accuracy of all/part of the resources selected in RSW-2 to be outdated and cannot be guaranteed, which thus the second UE may consider it as unavailable.

Optionally, the first UE divides the RSW into two sub-windows RSW-1 and RSW-2, where the former is used to determine the resources used for transmitting IUCI, and the latter is used to determine the preferred and/or non-preferred resources of the first UE to be indicated in the IUCI. Further, RSW-1 and/or RSW-2 are determined according to at least one of the following methods:

determining the first (not below) a certain percentage of the RSW or (not below) a certain threshold number of slots as RSW-1;

determining the last (not below) a certain percentage of slots or (not below) a certain threshold number of slots of the RSW as RSW-2;

determining the remaining RSWs that do not belong to RSW-1 as RSW-2; optionally, limited by UE processing delay, the end position of RSW-1 and the starting position of RSW-2 are spaced not less than a specific time length;

determining the remaining RSWs that do not belong to RSW-2 as RSW-1; optionally, limited by UE processing delay, the end position of RSW-1 and the starting position of RSW-2 are spaced not less than a specific time length.

The first UE performs sensing based on the determined RSW, and generates a candidate resource set, excludes candidate resources having interference or inapplicable candidate resources from the candidate resource set based on the sensing result and its own transmission, determines whether to adjust a RSRP threshold based on whether the number of candidate resources after the exclusion meets the threshold, and finally reports the generated candidate resource set to the high layer.

The UE generates a candidate resource set, including: by generating a candidate resource set for transmitting IUCI; and/or by generating preferred resources and/or non-preferred resources indicated in the IUCI. Further, the generating includes at least one of the following methods:

generating a set of candidate resources for transmitting IUCI in RSW-1, and generating in RSW-2 the preferred resources and/or non-preferred resources indicated in the IUCI;

determining the candidate resources on the first (not lower than) certain percentage slots or (not lower than) certain threshold slots of the RSW as the candidate resource set for transmitting IUCI, wherein, the candidate resources may be candidate resources before/after the resource exclusion step;

determining candidate resources on the last (not below) certain percentage of the RSW or (not below) a certain threshold number of slots as the candidate resources for generating resources and/or non-preferred resources indicated in the IUCI, wherein, the candidate resources can be candidate resources before/after the resource exclusion step, or candidate resources excluded in the resource exclusion step (at least can be used as non-preferred resources);

determining candidate resources on the first (not below) certain percentage or (not below) a certain threshold number (e.g., it may be $M_{total1}$) of candidate resources among the generated candidate resource set, as the candidate resource set for transmitting IUCI, wherein the candidate resources may be candidate resources before/after the resource exclusion step;

determining candidate resources on the last (not below) certain percentage or (not below) a certain threshold number (e.g., it may be $M_{total2}$) of candidate resources among the generated candidate resource set, as the candidate resources for generating preferred resources and/or non-preferred resources indicated in the IUCI, wherein, the candidate resources can be candidate resources before/after the resource exclusion step, or candidate resources excluded in the resource exclusion step (at least can be used as non-preferred resources);

determining the remaining candidate resources that do not belong to the candidate resource set for transmitting IUCI, as the candidate resources for generating resources and/or non-preferred resources indicated in the IUCI; optionally, limited by UE processing delay, the interval in time domain between the latest resource in the candidate resource set for transmitting IUCI and the earliest one in the candidate resources for generating resources and/or non-preferred resources indicated in the IUCI, is not less than a specific time length;

determining the remaining candidate resources that are not used to generate the preferred resources and/or the non-preferred resources indicated in the IUCI as the candidate resource set for transmitting IUCI; optionally, limited by UE processing delay, the interval in time domain between the latest resource in the candidate resource set for transmitting IUCI and the earliest one in the candidate resources for generating resources and/or non-preferred resources indicated in the IUCI, is not less than a specific time length.

In this process, the UE is triggered to transmit the IUCI, then obtain at least one of the following parameters indicated in the request signaling and/or higher layer: T2 min, which can be based on a priority $prio_{TX}$; RSRP threshold, which can be based on a priority combination ($p_i$, $p_j$); $T_O$, used to determine the length of the perception window; X, which can be based on the priority $prio_{TX}$, and the value thereof is used to determine whether the number of excluded candidate resources meets the threshold and whether to adjust the RSRP threshold.

Similar to T2 min, the UE obtains at least one of T2 min, $T_O$, and X, which are indicated in the request signaling/indicated by the high layer parameter, including obtaining based on at least one of the following methods:

obtaining at least one of the above by using the parameter identical to that in the resource determination procedure for sidelink transmission not used for transmitting/generating IUCI;

obtaining at least one of the above by using the parameter not identical to that in the resource determination procedure for sidelink transmission not used for transmitting/generating IUCI;

obtaining at least one of the above by using the parameter identical to that in the resource determination procedure for sidelink transmission not used for transmitting/generating IUCI, and using the obtained value plus a specific offset as the final value of at least one of the above. Wherein the parameters in the resource determination procedure for transmitting IUCI and the resource determination procedure for generating IUCI correspond to the same or different offsets.

Wherein the specific offset may be preset or (pre)configured and may be based on a priority. For example, the UE obtains T2 min and determines that T2 min'=T2 min+offset1, wherein the value of offset1 is separately configured by the higher layer for each priority, and the T2 min' determined by the UE is the value used in the resource selection process in Embodiment 1B.

Figure 6:
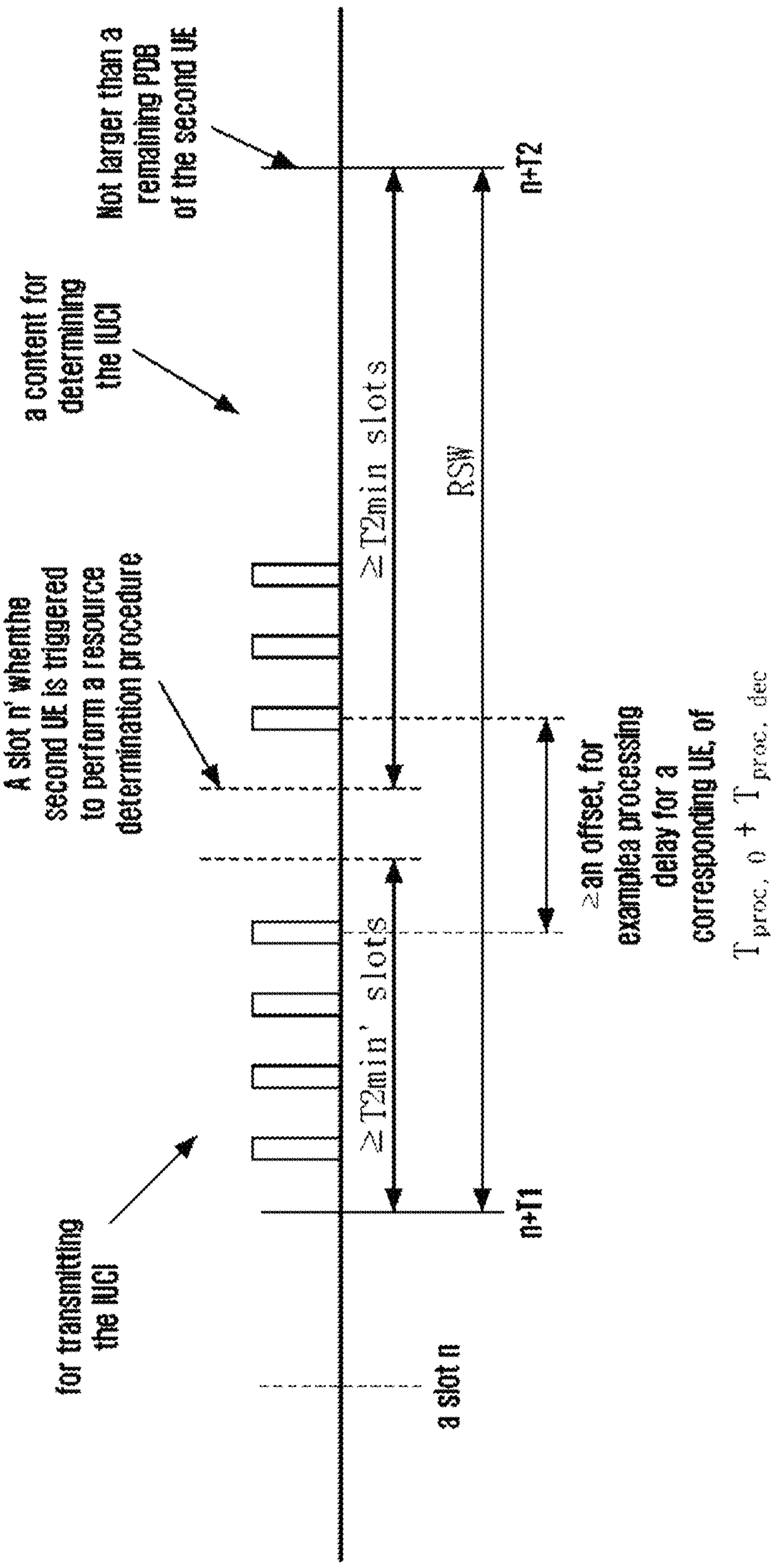
FIG. 6 is a schematic diagram of a specific example of Embodiment 1B provided by an embodiment of the present disclosure.

A specific example is that the UE obtains T2 min indicated in the request signaling/indicated by higher layer parameters, and when T2 min is less than the remaining PDBs, the UE determines T2 under the restriction of T2 min<=T2<=remaining PDBs; otherwise, T2 is set as the remaining PDBs. Optionally, when the UE determines the resource for transmitting IUCI, and/or determines the content of IUCI, and/or transmits non-IUCI sidelink signals/channels, the UE obtains T2 min according to the same or different high layer parameters. Optionally, when the UE determines the resource for transmitting IUCI, and/or determines the content of IUCI, and/or transmits non-IUCI sidelink signals/channels, the UE obtains T2 min according to the same parameter; when the UE determines the resource for transmitting IUCI, and/or determines the content of IUCI, a preset or configured offset is added to the acquired T2 min; the UE determines the resources for transmitting the IUCI and the content of the IUCI, which are corresponding to the same or different offset, as shown in FIG. 6.

Embodiment 2

The first UE transmits inter-UE coordination information (IUCI) to the second UE, which carries information related to channel state and/or radio interference, such as preferred/non-preferred resources, or resources for which conflict has occurred/is expected to occur, based on which the second UE determines whether to reselect the resources that have been previously selected for its future transmission, so as to improve reliability for sidelink transmission of the second UE. Optionally, if the second UE transmits sidelink data to the first UE, or the second UE expects to transmit sidelink data to the first UE, then the first UE transmits the IUCI to the second UE. In this embodiment, the first UE or the second UE may also be replaced by a base station.

In this embodiment, optionally, the content of the IUCI transmitted by the first UE to the second UE includes resources for which conflict has occurred/is expected to occur. The resources used by the first UE to transmit IUCI to the second UE, is (PSFCH) resources, specifically, it may be a PRB on a PSFCH slot, or a PRB on the last several symbols of a slot, similar to a PSFCH carrying HARQ-ACK feedback. Accordingly, when the UE enables the HARQ function and the IUC function simultaneously, the UE may need to transmit/receive one or more PSFCH formats carrying HARQ-ACK feedback and one or more PSFCH formats carrying IUCI, simultaneously. The embodiment provides a processing method when the UE needs to transmit/receive one or more PSFCH formats carrying HARQ-ACK feedback and one or more PSFCH formats carrying IUCI, simultaneously.

If the UE will transmit $N_{sch,Tx,PSFCH}$ PSFCHs carrying HARQ-ACK feedback and receive $N_{sch,Rx,PSFCH}$ PSFCHs carrying HARQ-ACK feedback, and transmit $N_{IUG,Tx,PSFCH}$ PSFCHs carrying IUCI and receive $N_{IUG,Rx,PSFCH}$ PSFCHs carrying IUCI, and the above transmission/reception are overlapped in time domain, then the UE transmits or receives one PSFCH set only corresponding to the smallest priority (a smaller priority value corresponds to a higher logical priority).

Wherein, for a PSFCH carrying HARQ-ACK feedback, its priority is determined by the value of the priority field indicated in the corresponding SCI. Wherein, for a PSFCH carrying IUCI, its priority is determined according to at least one of the following:

- the priority parameter indicated in higher layer or request signaling, which the UE is triggered by the higher layer signaling or request signaling to transmit IUCI;
- the priority parameter indicated in SCI transmitted by another US, which the UE is triggered, by the received transmission of the other UE, to transmit IUCI;
- IUCI-specific priorities; and
- the priority offset corresponding to IUCI, which can be used to add to the value of the priority parameter indicated in the higher layer or request signaling.

If the UE may transmit at most $N_{total,Tx,PSFCH}$ PSFCH formats on one PSFCH transmission opportunity (which may be a slot including (PSFCH) resources), the UE may transmit $N_{sch,Tx,PSFCH}$ PSFCHs carrying HARQ-ACK feedback and/or $N_{IUG,Tx,PSFCH}$ PSFCHs carrying IUCI, wherein $N_{sch,Tx,PSFCH}+N_{IUG,Tx,PSFCH}=N_{total,Tx,PSFCH}$. The UE may determine the value of $N_{total,Tx,PSFCH}$ based on UE capability. The method for the UE to determine $N_{sch,Tx,PSFCH}$ PSFCHs carrying HARQ-ACK feedback and/or $N_{IUG,Tx,PSFCH}$ PSFCHs carrying IUCIA, comprises at least one of the following:

- determining only according to the priority; for example, all PSFCHs carrying HARQ-ACK feedback and PSFCHs carrying IUCI with the highest priority (minimum value of priority) are prioritized selecting, and then all PSFCHs carrying HARQ-ACK feedback and PSFCHs carrying IUCI with the second highest priority are selected, until total $N_{total,Tx,PSFCH}$ PSFCHs are selected; in this method, the priorities of PSFCHs carrying HARQ-ACK feedback and PSFCHs carrying IUCI are considered to be only determined by own priorities, regardless of whether the content carried by the PSFCH is HARQ-ACK feedback or IUCI;
- prioritizing selecting the PSFCH carrying the specific content, within the same priority, based on whether the content carried by the PSFCH is HARQ-ACK feedback or IUCI;
- prioritizing selecting the PSFCH carrying the specific content based on whether the content carried by the PSHCH is ACK, NACK, or IUCI, within the same priority, which is further determined based on that the traffic type is unicast/groupcast, and/or based on groupcast HARQ-ACK feedback options (ACK+NACK, NACK only); for example, for unicast or ACK+NACK groupcast, PSFCH with ACK takes precedence over PSFCH with IUCI which taking precedence over PSFCH with NACK, and for NACK-only groupcast, the PSFCH carrying NACK has priority over the PSFCH carrying IUCI (in preference to the PSFCH carrying ACK, if it exists);
- determining according to the priority and the content carried by the PSFCH; for example, for a PSFCH carrying specific content, when multiple PSFCHs that need to be transmitted simultaneously are determined according to priority, and priority used to compare whether to transmit the PSFCH is an actual priority of PSFCH plus an offset. Wherein, the offset may be determined based on that the content carried by the PSFCH is HARQ-ACK feedback (or ACK, NACK), and/or based on the traffic type (unicast/groupcast/broadcast), and/or based on groupcast HARQ-ACK ACK feedback options.

For determining according to the priority and the content carried by the PSFCH, a specific example is: the UE needs to transmit PSFCH1, PSFCH2, and PSFCH3, wherein the PSFCH1 carries the HARQ-ACK feedback, the priority indicated by the SCI corresponding to PSFCH1 is 0, and the offset corresponding to HARQ-ACK feedback is 0, and the UE regards the priority of PSFCH1 as 0 when performing prioritization among multiple PSFCHs transmitted simultaneously. PSFCH1 carries the HARQ-ACK feedback, the priority indicated by the SCI corresponding to the PSFCH1 is 0, and the offset corresponding to the HARQ-ACK feedback is 0; when the UE performs prioritization among multiple PSFCHs transmitted simultaneously, the priority of the PSFCH1 is regarded as 0. PSFCH3 carries IUCI, PSFCH3 is triggered by PSCCH/PSSCH transmitted by other UEs, the priority indicated by the corresponding SCI is 2, and the offset corresponding to IUCI is 2, then the UE performs prioritization among multiple PSFCHs transmitted simultaneously, the priority of PSFCH3 is regarded as 4. Therefore, when the UE can only transmit one PSFCH, the UE prioritizes transmitting PSFCH1; when the UE can transmit two PSFCHs, the UE transmits PSFCH1, and randomly selects another one of PSFCH2 and PSFCH3 for transmission.

In the above schemes, the method of determining the value of T1 and/or T2 based on the UE processing delay may be used in combination with other methods. For example, assuming that the second UE needs to determine transmission resources of the second UE based on preferred and/or non-preferred resources indicated in the IUCI, after completing the reception of the IUCI, then the time interval between the slot where the resource for transmitting the IUCI is located/the end position of RSW-1 and the slot where the earliest resource indicated in the IUCI is located, should be not less than the UE processing delay, or the time interval between the slot where the resource for transmitting the IUCI is located/the end position of RSW-1 and the starting position of RSW of the second UE and/or the time point when the second UE is triggered to perform the resource determination procedure for sidelink transmission, should be not less the UE processing delay.

A slot in embodiments of the present disclosure may be either a subframe or slot in a physical sense, or a subframe or slot in a logical sense. Specifically, a subframe or slot in a logical sense is a subframe or slot corresponding to a resource pool of a sidelink communication. For example, in the V2X system, the resource pool is defined by a repeated bitmap mapped to a specific slot set, which may be all slots or all other slots except some specific slots (such as slots for transmitting the MIB/SIB). A slot indicated as "1" in the bitmap may be used for V2X transmission and belongs to slots corresponding to the V2X resource pool. A slot indicated as "0" cannot be used for V2X transmission and does not belong to slots corresponding to the V2X resource pool.

The difference between subframes or slots in a physical sense or that in a logical sense is explained by a typical application scenario: when calculating the time domain gap between two specific channels/messages (e.g., a PSSCH carrying sidelink data and a PSFCH carrying corresponding feedback information), and it is assumed that the gap is N slots, if calculating subframes or slots in a physical sense, the N slots correspond to the absolute time length of N*x milliseconds in the time domain, and x is the time length of a physical slot (subframe) under the numerology of the scenario, in milliseconds; otherwise, if calculating subframes or slots in a logical sense, taking a sidelink resource pool defined by a bitmap as an example, the intervals among the N slots correspond to N slots indicated as "1" in the bitmap, and the absolute time length of the interval varies with the specific configuration of the sidelink communication resource pool, rather than a fixed value.

Further, in embodiments of the present disclosure, a slot may be a complete slot or several OFDM symbols corresponding to sidelink communication in a slot. For example, when the sidelink communication is configured to be performed on the X1-X2-th OFDM symbols in each slot, in this scenario, a slot in the following embodiments refers to the X1-X2-th OFDM symbols in a slot; or, when the sidelink communication is configured to be transmitted in a mini-slot, in this scenario, a slot in the following embodiments refers to the mini-slot defined or configured in the sidelink system, rather than the slot in the NR system; or, when the sidelink communication is configured as symbol-level transmission, in this scenario, a slot in the embodiments may be replaced with OFDM symbols, or may be replaced with N OFDM symbols which are the time domain granularity of the symbol-level transmission.

In embodiments of the present disclosure, information configured by the base station, information indicated by signaling, information configured by a higher layer, and preconfigured information includes a set of configuration information; and further includes multiple sets of configuration information, for which the UE select one set of configuration information from the multiple sets of configuration information for use according to a predefined condition; and further includes multiple subsets of a set of configuration information, for which the UE selects a subset from the multiple subsets for use according to a predefined condition. The information indicated by the high layer may be obtained from the information configured by the high layer/base station or determined based on the information configured by the high layer/base station.

In embodiments of the present disclosure, some of the technical solutions provided are specifically described based on the V2X system, but their application scenarios should not be limited to the V2X system in sidelink communication, but may also be applied to other sidelink transmission systems. For example, the design based on V2X subchannels in the following embodiments may also be used for D2D subchannels or other subchannels for sidelink transmission. The V2X resource pool in the following embodiments may also be replaced by the D2D resource pool in other sidelink transmission systems such as the D2D.

In embodiments of the present disclosure, when the sidelink communication system is a V2X system, a terminal or UE may be various types of terminals or UEs such as a vehicle, an infrastructure, and a pedestrian.

In embodiments of the present disclosure, the phase "below" may also be replaced by "below or equal to"; and "larger than (exceeding)" may be replaced by "above or equal to". The phase "less than or equal to" may also be replaced according to at least one of "less than" or "equal to"; and the phase "larger than or equal to" may also be replaced according to at least one of "greater than" or "equal to".

The sidelink communication method provided in the embodiments of the present disclosure, realizes accurate and efficient generation of INCI based on a suitable time-frequency resource range, by determining a content of INCI and determining a resource for transmitting the INCI, and transmits the INCI to a node that needs the information within a suitable time range, such that other nodes can use the INCI in the time range that meets their needs in the process of determining transmission resources to the other nodes, so as to effectively improve reliability of a sidelink communication system without over-increasing overhead.

Figure 7:
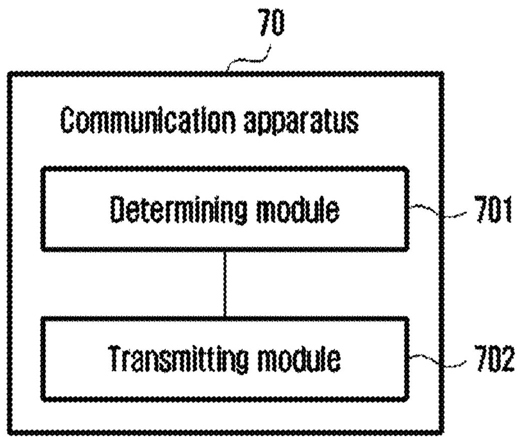
FIG. 7 is a schematic structural diagram of a communication apparatus provided by an embodiment of the present disclosure.

An embodiment of the present disclosure provides a communication apparatus. As shown in FIG. 7, the communication apparatus 70 may include: a determining module 701 and a transmitting module 702, wherein, the determining module 701 is configured to determine a resource for transmitting inter-node coordination information (INCI) and a content of the INCI; and the transmitting module 702 is configured to transmit the INCI to a second node based on the resource for transmitting the INCI and the content of the INCI.

In one optional implementation, when the determining module 701 is configured to determine the resource for transmitting the INCI and the content of the INCI, it is specifically configured to perform at least one of the following:

determining the resource for transmitting the INCI according to a first resource selection window (RSW), and determining the content of the INCI according to a second RSW; and determining, according to a third RSW, the resource for transmitting the INCI and the content of the INCI.

In one optional implementation, if the first RSW or the second RSW or the third RSW is [n+T1, n+T2], when the determining module 701 is configured to determine the resource for transmitting the INCI and/or determining the content of the INCI, according to the RSW, it is further configured to perform:

determining a value of T1 and/or T2 based on at least one of the following:

a parameter related to the INCI;

a value of the parameter related to the INCI;

a remaining packet delay budget (PDB) of a transmission of the second node;

time when the second node is triggered to perform a resource determination procedure;

a starting position of the RSW of the second node;

an end position of the RSW of the second node;

a size range of the RSW of the second node;

a position and/or a number of candidate resources of the second node;

a position and/or a number of candidate time units of the second node;

remaining PDBs indicated by a higher layer;

a node processing delay; and validity of the INCI.

In one optional implementation, when the determining module 701 is configured to determine the value of T1 and/or T2 based on the validity of the INCI, it is further configured to perform at least one of the following:

determining that a value of n+T1 and/or n+T2 is not less than a difference between the time unit in which the second node is triggered to perform the resource determination procedure and a first predetermined time length;

determining that the value of n+T1 and/or n+T2 of the first RSW is not less than a difference between the starting position or the end position of the second RSW and a second predetermined length of time;

determining that the value of n+T1 and/or n+T2 of the second RSW is not larger than a sum of the starting position or the end position of the first RSW and the second predetermined length of time;

determining that the value of n+T1 and/or n+T2 of the first RSW is not less than a difference between the position of the preferred resource and/or the non-preferred resource selected by the first node in the second RSW and the second predetermined length of time; and determining that the value of n+T1 and/or n+T2 of the second RSW is not larger than a sum of the resource and/or a candidate resource for transmitting the INCI in the first RSW selected by the first node and the second predetermined length of time;

wherein, the first predetermined time and the second predetermined time are time lengths corresponding to a time validity of the INCI.

In one optional implementation, if the first RSW or the second RSW is [n+T1, n+T2], when the determining module 701 is configured to determine the resource for transmitting the INCI according to the first RSW and/or determining the content of the INCI according to the second RSW, it is further configured to perform:

determining the value of T1 and/or T2 of another RSW according to at least one of the following of one RSW of the first RSW and the second RSW:

a starting position;

an end position;

a size range.

In one optional implementation, the time interval between the time unit where the resource for transmitting the INCI is located and the time unit where the earliest resource indicated in the INCI is located is not less than a node processing delay; and/or, the time interval between the end position of the first RSW and the time unit where the curliest resource indicated in the INCI is located is not less than the node processing delay; and/or, the time interval between the time unit where the resource for transmitting the INCI is located and the starting position of the RSW of the second node is not less than the node processing delay; and/or, the time interval between the time unit where the resource for transmitting the INCI is located and the time when the second node is triggered to perform the resource determination procedure is not less than the node processing delay; and/or, the time interval between the end position of the first RSW and the starting position of the RSW of the second node is not less than the node processing delay; and/or, the time interval between the end position of the first RSW and the time when the second node is triggered to perform the resource determination procedure is not less than the node processing delay;

wherein, the node processing delay includes the sum of at least one of the following:

a delay for the node to decode the INCI;

a delay for the node to use information indicated in the INCI;

a delay for the node to generate and transmit data; and a delay for the node to process a sensing result.

In one optional implementation, the parameter related to the INCI, comprises at least one of the following:

a time range in which the first node transmits the INCI;

a time range in which the second node receives the INCI;

the starting position and/or the end position of the RSW of the INCI of the first node;

a size range of the RSW of the INCI of the first node.

In one optional implementation, when the determining module 701 is configured to determine the value of T1 and/or T2 according to INCI-related parameter, it is further configured to perform at least one of the following:

determining that the value of n+T1 is not less than a starting position of a time range in which the first node transmits the INCI or a starting position of a time range in which the second node receives the INCI;

determining that the value of n+T2 is not larger than an end position of the time range in which the first node transmits the INCI or an end position of the time range in which the second node receives the INCI;

determining that the value of n+T2 of the first RSW is not larger than a difference between the starting position of the second RSW and a first offset, wherein the first offset corresponds to the node processing delay; and determining that the value of n+T1 of the second RSW is not less than a sum of the end position of the first RSW and the first offset, wherein the first offset corresponds to the node processing delay.

In one optional implementation, when the determining module 701 is configured to determine the value of T1 and/or T2 according to the remaining PDB of the transmission of the second node, it is further configured to perform at least one of the following:

determining that the value of T1 and/or T2 is not larger than a difference between the remaining PDB of the transmission of the second node and a second offset, wherein the second offset is determined according to at least one of the following:

a size range of the RSW of the second node;

a size range of the RSW of the first node;

a node processing delay.

In one optional implementation, when the determining module 701 is configured to determine the value of T2 according to the starting position and/or the end position of the RSW of the second node, it is specifically configured to perform at least one of the following:

determining that the value of n+T2 of the first RSW is not larger than a difference between the starting position of the RSW of the second node and a third offset, wherein the third offset corresponds to the node processing delay; and determining that the value of n+T2 of the first RSW is not larger than a difference between the end position of the RSW of the second node and a fourth offset, wherein the fourth offset corresponds to the length of the RSW of the second node, and/or the size range of the RSW of the second node, and/or the node processing delay of the second node.

In one optional implementation, when the determining module 701 is configured to determine the value of T2 according to the position and/or the number of candidate resources of the second node, or the position and/or the number of candidate time units of the second node, it is further configured to perform at least one of the following:

determining that the value of n+T2 of the first RSW is not larger than a difference between the time unit where the earliest one of the candidate resources of the second node is located and a fifth offset, wherein the fifth offset corresponds to the node processing delay;

determining that the value of n+T2 of the first RSW is not larger than a difference between the earliest time unit in the candidate time units of the second node and the fifth offset; and determining that the value of n+T2 of the first RSW is not larger than a value obtained by subtracting second information from first information and then subtracting a sixth offset, wherein the first information is the end position of the RSW of the second node or "n+remaining PDBs" of the RSW of the second node, and the second information is a minimum number of candidate resources or candidate time units of the second node.

In one optional implementation, when the determining module 701 is configured to determine the resource for transmitting inter-node coordination information (INCI) and/or determine content of the INCI, it is specifically configured to perform at least one of the following:

triggering to determine the resource for transmitting the INCI and/or determine the content of the INCI according to the request signaling from the second node and/or the parameter indicated by the higher layer, wherein there is a predetermined offset between the parameter and a parameter used in a resource determination procedure for a resource not used for transmission or generating the transmission of the INCI.

In one optional implementation, when the determining module 701 is configured to determine the resource for transmitting the INCI and the content of the INCI, it is specifically configured to perform at least one of the following:

determining, triggered by the request signaling of the second node, the resource for transmitting the INCI and/or the content of INCI;

determining, triggered by an indication of a higher layer, the resource for transmitting inter-node coordination information (INCI) and/or content of the INCI.

In an optional implementation manner, at least one of the following parameters indicated by signaling is requested:

a resource pool in which the second node performs transmission;

the priority of a transmission of the second node;

a remaining PDB of the transmission of the second node;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node;

a time range in which the first node transmits the INCI;

a time range in which the second node receives the INCI;

the starting position and/or the end position of the RSW of the INCI of the first node;

whether the second node supports or enables or disables re-evaluation;

whether the second node supports or enables or disables pre-emption;

a corresponding re-evaluated resource set or resource range transmitted by the second node; and a corresponding pre-empted resource set or resource range transmitted by the second node.

In an optional implementation manner, the higher layer provides at least one of the following parameters:

a resource pool corresponding to the resource, reported by the first node to the higher layer;

the priority of the INCI of the first node;

the priority of a transmission of the second node;

remaining PDBs;

a time range in which the first node transmits the INCI;

a time range in which the second node receives the INCI;

the starting position and/or the end position of the RSW for transmitting the INCI;

the starting position and/or the end position of the RSW for determining the content of the INCI;

the starting position and/or the end position of the RSW of the second node;

a size range of the RSW of the second node;

a position and/or a number of candidate resources of the second node;

a position and/or a number of candidate time units of the second node;

the number of sub-channels used in the transmission to the second node;

a resource reservation interval of the transmission of the second node.

In one optional implementation, the resource for transmitting the INCI is a physical sidelink feedback channel (PSFCH) resource, and the INCI is carried in the PSFCH.

In one optional implementation, upon transmitting the INCI to the second node, the transmitting module 702 is specifically configured to perform at least one of the following:

transmitting at least one of the following to the second node:

at least one INCI with the highest priority in the INCI;

at least one HARQ-ACK with the highest priority among the Hybrid Automatic Repeat Request-Acknowledges (HARQ-ACKs); and at least one INCI and/or HARQ-ACK with the highest priority among INCIs and HARQ-ACKs.

In one optional implementation, upon transmitting the INCI to the second node, the transmitting module 702 is specifically configured to transmit at least one of the following:

at least one PSFCH with the highest priority among PSFCHs carrying the INCI;

at least one PSFCH with the highest priority among the PSFCHs carrying the Hybrid Automatic Repeat Request-Acknowledge (HARQ-ACK); and at least one PSFCH with the highest priority among PSFCHs carrying the INCI and PSFCHs carrying HARQ-ACK.

In one optional implementation, a priority of the PSFCH carrying the INCI is determined according to at least one of the following:

a priority parameter indicated by a request signaling of the second node and/or indicated by a higher layer;

a priority parameter indicated in the sidelink control message (SCI) transmitted by the third node, wherein the third node is a node that triggers the first node to transmit the INCI;

INCI-specific priorities; and a priority offset corresponding to the INCI.

In one optional implementation, the transmitting module 702 is further configured to perform:

determining PSFCH to be transmitted, according to at least one of the priority of the PSFCH, a content carried by the PSFCH, a traffic type, and a HARQ-ACK feedback option based on groupcast.

In one optional implementation, when determining PSFCH to be transmitted, the transmitting module 702 is specifically configured to perform at least one of the following:

prioritizing transmitting PSFCH carrying a specific content, for a specific traffic type or a specific HARQ-ACK feedback option of a groupcasted traffic.

In one optional implementation, when determining PSFCH to be transmitted, the transmitting module 702 is specifically configured to perform at least one of the following:

determining the PSFCH to be transmitted according to a sum of the priority of the PSFCH and a ninth offset, for PSFCH carrying a specific content;

wherein the ninth offset is determined based on at least one of the content carried by the PSFCH, the traffic type, and the HARQ-ACK feedback option based on groupcast.

In an optional implementation manner, when the first node is a user equipment (UE), the inter-node coordination information (INCI) is inter-UE coordination information (IUCI).

The apparatus of the embodiment of the present disclosure may perform methods provided by embodiments of the present disclosure, and the implementation principles thereof are similar. Actions performed by each module in the apparatus of the embodiment of the present disclosure are corresponding to steps in methods of the embodiments of the present disclosure, for the detailed functional description of each module of the apparatus and the beneficial effects produced, reference may be made to the description in the corresponding methods described above, and details are not repeated here.

An embodiment of the present disclosure provides an electronic device, including: a transceiver; and a processor, coupled to the transceiver and configured to control to execute the above computer program to implement the steps of the foregoing method embodiments.

Figure 8:
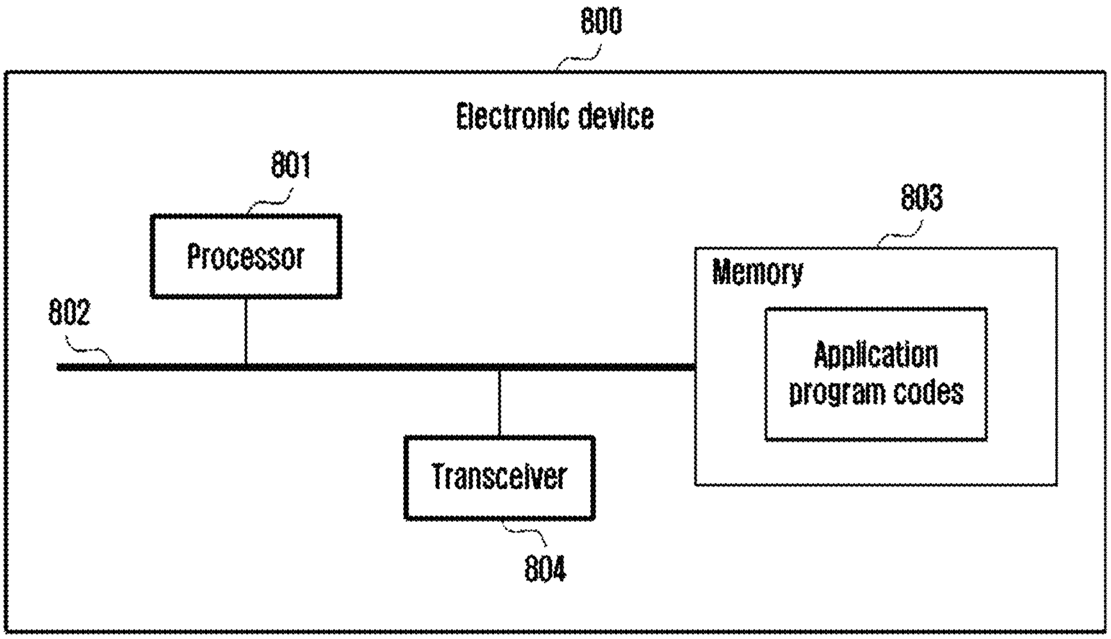
FIG. 8 is a schematic structural diagram of an electronic device provided according to an embodiment of the application.

In an optional embodiment, an electronic device is provided, as shown in FIG. 8. The electronic device 800 shown in FIG. 8 includes: a processor 801 and a memory 803. The processor 801 and the memory 803 are connected, for example, via a bus 802. Optionally, the electronic device 800 may further include a transceiver 804, and the transceiver 804 may be used for data interaction between the electronic device and other electronic devices, such as data transmission and/or data reception. It should be noted that the transceiver 804 is not limited to one in actual application, and the structure of the electronic device 800 is not limited to the embodiment of the present disclosure.

The processor 801 may be a Central Processing Unit (CPU), a general-purpose processor, a Digital Signal Processor (DSP), an Application Specific Integrated Circuit (ASIC), a Field Programmable Gated Array (FPGA) or other programmable logic devices, transistor logic devices, hardware components, or any combination thereof. Various exemplary logic blocks, modules, and circuits described in connection with the present disclosure may be implemented or executed. The processor 801 may also be a combination that implements computing functions, such as a combination that includes one or more microprocessors, a combination of DSP and microprocessors, etc.

The bus 802 may include a path to transfer information between the above components. The bus 802 may be a Peripheral Component Interconnect (PCI) bus or an Extended Industry Standard Architecture (EISA) bus or the like. The bus 802 can be divided into an address bus, a data bus, a control bus, etc. For case of representation, the bus is expressed by only one thick line in FIG. 8, but it does not mean only one bus or one type of bus.

The memory 803 may be a Read Only Memory (ROM) or other types of static storage device that can store static information and instructions, a Random Access Memory (RAM) or other types of dynamic storage device that can store information and instructions. It can also be an Electrically Erasable Programmable Read Only Memory (EEPROM), a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 803 is configured to store computer program for executing the embodiments of the present disclosure, and the execution is controlled by the processor 801. The processor 801 is configured to execute the computer program stored in the memory 803 to implement the contents shown in any of the foregoing method embodiments.

An embodiment of the present disclosure provides a computer-readable storage medium, where a computer program is stored on the computer-readable storage medium, and when the computer program is executed by a processor, the steps and corresponding contents of the foregoing method embodiments can be implemented.

An embodiment of the present disclosure also provides a computer program product, including a computer program, and when the computer program is executed by a processor, the steps and corresponding contents of the foregoing method embodiments can be implemented.

It should be understood that, although each operation step is indicated by arrows in the flowcharts of the embodiments of the present disclosure, the execution order of these steps is not limited to the order indicated by the arrows. Unless explicitly stated herein, in some implementation scenarios of the embodiments of the present disclosure, the implementation steps in each flowchart may be performed in other sequences as required. In addition, some or all of the steps in each flowchart are based on actual implementation scenarios, and may include multiple sub-steps or multiple stages. Some or all of these sub-steps or stages may be executed simultaneously, and each of these sub-steps or stages may also be executed at different times respectively. In scenarios with different execution times, the execution order of these sub-steps or stages may be flexibly configured according to requirements, which is not limited in this embodiment of the present disclosure.

The above are only optional implementations of the application's partial implementation scenarios. It should be pointed out that for those of ordinary skill in the art, without departing from the technical concept of the solution of the application, other similar implementation means based on adopting the technical concept of the application also belong to the protection scope of the embodiments of the present disclosure.

The invention claimed is:

1. A method performed by a first user equipment (UE) in a communication system, the method comprising:

identifying first physical sidelink feedback channels (PSFCHs) including hybrid automatic repeat request acknowledgement (HARQ-ACK) information and second PSFCHs including conflict information associated with inter-UE coordination;

identifying, among the first PSFCHs and the second PSFCHs, one or more PSFCHs to be transmitted in a PSFCH transmission opportunity based on prioritizing according to whether a PSFCH includes the HARQ-ACK information or the conflict information; and transmitting the one or more PSFCHs in the PSFCH transmission opportunity.

2. A first user equipment (UE) in a communication system, the first UE comprising:

a transceiver; and a processor coupled with the transceiver and configured to:

identify first physical sidelink feedback channels (PSFCHs) including hybrid automatic repeat request acknowledgement (HARQ-ACK) information and second PSFCHs including conflict information associated with inter-UE coordination, identify. among the first PSFCHs and the second PSFCHs, one or more PSFCHs to be transmitted in a PSFCH transmission opportunity based on prioritizing according to whether a PSFCH includes the HARQ-ACK information or the conflict information, and transmit the one or more PSFCHs in the PSFCH transmission opportunity.

3. The method of claim 1, wherein, for the prioritizing, a PSFCH including the HARQ-ACK information corresponds to a higher priority than a PSFCH including the conflict information.

4. The method of claim 1, further comprising:

receiving, from a second UE, a request signal to trigger the first UE to transmit inter-UE coordination information to the second UE, wherein the request signal includes first information on a starting position and an end position of a resource selection window;

determining, based on the first information, a first set of preferred resources of the first UE;

transmitting, to the second UE, the inter-UE coordination information including information on the first set of preferred resources; and receiving a sidelink channel from the second UE on at least one first resource associated with the first set of preferred resources.

5. The method of claim 4, wherein the first set of preferred resources is included in the resource selection window.

6. The method of claim 4, wherein the resource selection window corresponds to the second UE, and wherein the request signal further includes:

second information on a resource reservation period corresponding to the second UE, third information on a number of sub-channels corresponding to the second UE, and fourth information on a priority corresponding to the second UE.

7. The first UE of claim 2, wherein, for the prioritizing, a PSFCH including the HARQ-ACK information corresponds to a higher priority than a PSFCH including the conflict information.

8. The first UE of claim 2, wherein the processor is configured to:

receive, from a second UE, a request signal to trigger the first UE to transmit inter-UE coordination information to the second UE, wherein the request signal includes first information on a starting position and an end position of a resource selection window;

determine, based on the first information, a first set of preferred resources of the first UE;

transmit, to the second UE, the inter-UE coordination information including information on the first set of preferred resources; and receive a sidelink channel from the second UE on at least one first resource associated with the first set of preferred resources.

9. The first UE of claim 8, wherein the first set of preferred resources is included in the resource selection window.

10. The first UE of claim 8, wherein the resource selection window corresponds to the second UE, and wherein the request signal further includes:

second information on a resource reservation period corresponding to the second UE, third information on a number of sub-channels corresponding to the second UE, and fourth information on a priority corresponding to the second UE.

* * * * *